United States Patent
Tolman

(10) Patent No.: US 10,499,193 B2
(45) Date of Patent: Dec. 3, 2019

(54) COLLABORATIVE GEO-POSITIONING OF ELECTRONIC DEVICES

(71) Applicant: Satori Worldwide, LLC, Palo Alto, CA (US)

(72) Inventor: Caleb Tolman, Palo Alto, CA (US)

(73) Assignee: Satori Worldwide, LLC, Palo Alto, CA (US)

(*) Notice: Subject to any disclaimer, the term of this patent is extended or adjusted under 35 U.S.C. 154(b) by 0 days.

(21) Appl. No.: 15/925,219

(22) Filed: Mar. 19, 2018

(65) Prior Publication Data

US 2018/0270620 A1     Sep. 20, 2018

Related U.S. Application Data

(60) Provisional application No. 62/473,726, filed on Mar. 20, 2017.

(51) Int. Cl.
*H04W 4/00* (2018.01)
*H04W 4/029* (2018.01)
(Continued)

(52) U.S. Cl.
CPC .............. *H04W 4/029* (2018.02); *G01S 5/02* (2013.01); *G01S 5/0205* (2013.01); *H04L 67/26* (2013.01);
(Continued)

(58) Field of Classification Search
CPC ....... H04W 4/029; H04W 4/026; H04W 4/12; H04W 64/00; G01S 5/02; G01S 5/0205; H04L 67/26
See application file for complete search history.

(56) References Cited

U.S. PATENT DOCUMENTS 8,320,939 B1* 11/2012 Vincent ................... G01S 19/48
                                                            370/338
8,874,133 B2* 10/2014 Flanagan ............. H04W 64/00
                                                            455/456.1
(Continued)

FOREIGN PATENT DOCUMENTS

EP      2626719 A2      8/2013
GB      2536846 A       9/2016
WO      2008115209 A2   9/2008

OTHER PUBLICATIONS

International Search Report and Written Opinion of the International Searching Authority dated Jun. 28, 2018 for International Application No. PCT/US2018/023335.

*Primary Examiner* — Khai M Nguyen
(74) *Attorney, Agent, or Firm* — Womble Bond Dickinson (US) LLP; Daniel E. Ovanezian

(57) ABSTRACT

Methods and systems for determining and tracking electronic devices are provided. One method includes receiving measurement data from at least a subset of a plurality of client electronic devices. The measurement data are captured by each respective client electronic device of the subset of the plurality of client electronic devices. The method further includes generating geolocation estimation data for at least one of the subset of the plurality of client electronic devices based at least in part on the measurement data, and generating a geolocation confidence value based at least in part on the geolocation estimation data. The geolocation confidence value indicates a precision level of the geolocation estimation data. The method further includes transmitting the geolocation estimation data and the geolocation confidence value to the at least one of the subset of the plurality of client electronic devices.

20 Claims, 20 Drawing Sheets

(51) Int. Cl.
 *G01S 5/02* (2010.01)
 *H04W 4/02* (2018.01)
 *H04W 64/00* (2009.01)
 *H04L 29/08* (2006.01)
 *H04W 4/12* (2009.01)

(52) U.S. Cl.
 CPC .............. *H04W 4/026* (2013.01); *H04W 4/12* (2013.01); *H04W 64/00* (2013.01)

(56) References Cited

U.S. PATENT DOCUMENTS

| | | | |
|---|---|---|---|
| 9,971,775 B2 * | 5/2018 | Laptev | G06F 17/30061 |
| 2010/0090901 A1 * | 4/2010 | Smith | G01S 5/021 |
| | | | 342/451 |
| 2013/0210450 A1 * | 8/2013 | Kenington | G01S 5/0252 |
| | | | 455/456.1 |
| 2015/0072714 A1 * | 3/2015 | Froehlich | H04W 4/023 |
| | | | 455/457 |
| 2016/0127871 A1 | 5/2016 | Smith et al. | |
| 2016/0316503 A1 | 10/2016 | Raphael | |
| 2017/0024397 A1 * | 1/2017 | Laptev | G06F 17/3087 |

\* cited by examiner

COLLABORATIVE GEO-POSITIONING OF ELECTRONIC DEVICES

CROSS-REFERENCE TO RELATED APPLICATIONS

This application claims the benefit of U.S. Provisional Patent Application No. 62/473,726, filed Mar. 20, 2017, the entire contents of which are hereby incorporated by reference.

BACKGROUND

This specification relates to a data communication system and, in particular, systems and methods for determining and tracking the approximate geolocation of electronic devices.

The publish-subscribe (or "PubSub") pattern is a data communication messaging arrangement implemented by software systems where so-called publishers publish messages to topics and so-called subscribers receive the messages pertaining to particular topics to which they are subscribed. There can be one or more publishers per topic and publishers generally have no knowledge of what subscribers, if any, will receive the published messages. Because publishers may publish large volumes of messages, and subscribers may subscribe to many topics (or "channels") the overall volume of messages directed to a particular channel and/or subscriber may be difficult to manage.

DETAILED DESCRIPTION

Elements of examples or embodiments described with respect to a given aspect of the invention can be used in various embodiments of another aspect of the invention. For example, it is contemplated that features of dependent claims depending from one independent claim can be used in apparatus, systems, and/or methods of any of the other independent claims.

The details of one or more embodiments of the subject matter described in this specification are set forth in the accompanying drawings and the description below. Other features, aspects, and advantages of the subject matter will become apparent from the description, the drawings, and the claims.

A system architecture for locating and tracking electronic devices in indoor and outdoor environments may include a messaging system. The messaging system may support the PubSub communication pattern and may allow publishers and subscribers to publish and receive live messages. Users of certain electronic devices may want to determine and track other electronic devices, and thus may include both publishers and subscribers of the messaging system. Electronic devices may publish messages that indicate approximate geolocations of the electronic devices. Users may view the messages and corresponding approximate geolocations of the electronic devices as the users of the electronic devices move within or about indoor or outdoor environments.

For example, the present embodiments may be directed to a schema for collaborative geo-positioning of multiple electronic devices that may improve triangulation accuracy and precision of locating one or more electronic devices of a number of electronic devices by calculating and recording information that may be used to improve accuracy and precision of future geolocation estimates. The present techniques also minimize the amount of information stored on servers that could be used to track and locate devices in indoor and outdoor environments, or even worldwide in some examples. In this way, the present embodiments may provide techniques to efficiently determine and track the approximate geolocation of electronic devices within or about indoor and outdoor environments, or otherwise in any of various environments in which large-scale satellite systems may be inaccurate, imprecise, or otherwise unavailable.

Figure 1A:
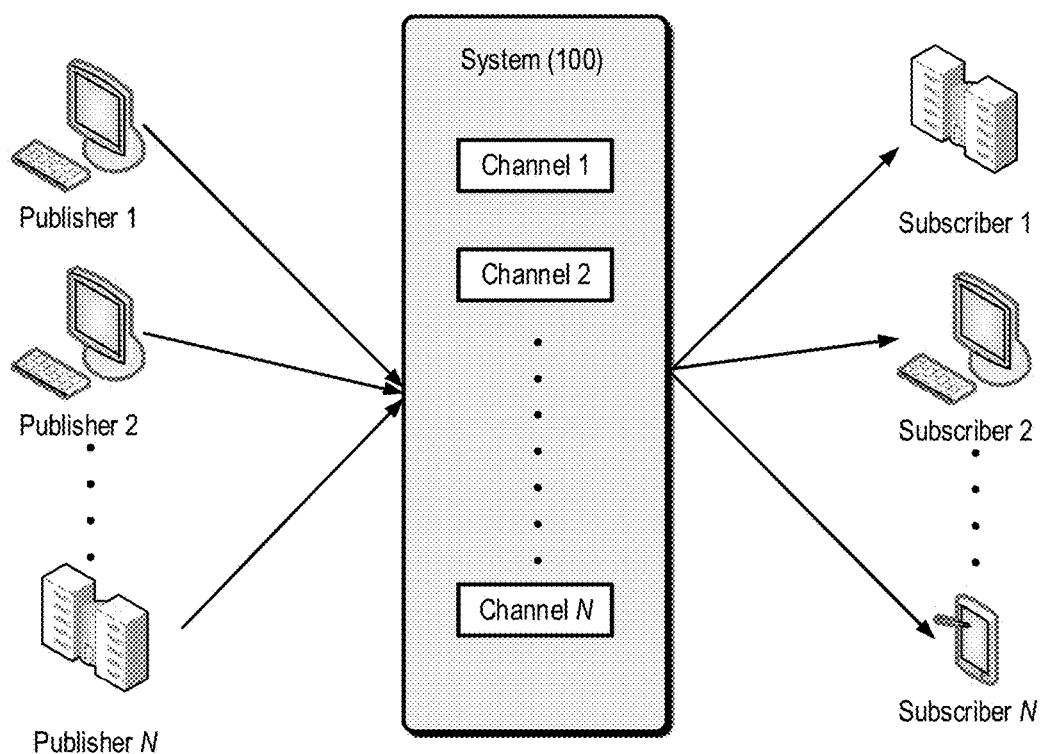
FIG. 1A illustrates an example system that supports the PubSub communication pattern.

FIG. 1A illustrates an example system 100 that supports the PubSub communication pattern. Publisher clients (e.g., Publisher 1) can publish messages to named channels (e.g., "Channel 1") by way of the system 100. A message can comprise any type of information including one or more of the following: text, image content, sound content, multimedia content, video content, binary data, and so on. Other types of message data are possible. Subscriber clients (e.g., Subscriber 2) can subscribe to a named channel using the system 100 and start receiving messages which occur after the subscription request or from a given position (e.g., a message number or time offset). A client can be both a publisher and a subscriber.

Depending on the configuration, a PubSub system can be categorized as follows:

One to One (1:1). In this configuration there is one publisher and one subscriber per channel. A typical use case is private messaging.

One to Many (1:N). In this configuration there is one publisher and multiple subscribers per channel. Typical use cases are broadcasting messages (e.g., stock prices).

Many to Many (M:N). In this configuration there are many publishers publishing to a single channel. The messages are then delivered to multiple subscribers. Typical use cases are map applications.

There is no separate operation needed to create a named channel. A channel is created implicitly when the channel is subscribed to or when a message is published to the channel. In some implementations, channel names can be qualified by a name space. A name space comprises one or more channel names. Different name spaces can have the same channel names without causing ambiguity. The name space name can be a prefix of a channel name where the name space and channel name are separated by a dot or other suitable separator. In some implementations, name spaces can be used when specifying channel authorization settings. For instance, the messaging system 100 may have app1.foo and app1.system.notifications channels where "app1" is the name of the name space. The system can allow clients to subscribe and publish to the app1.foo channel. However, clients can only subscribe to, but not publish to the app1.system.notifications channel.

Figure 1B:
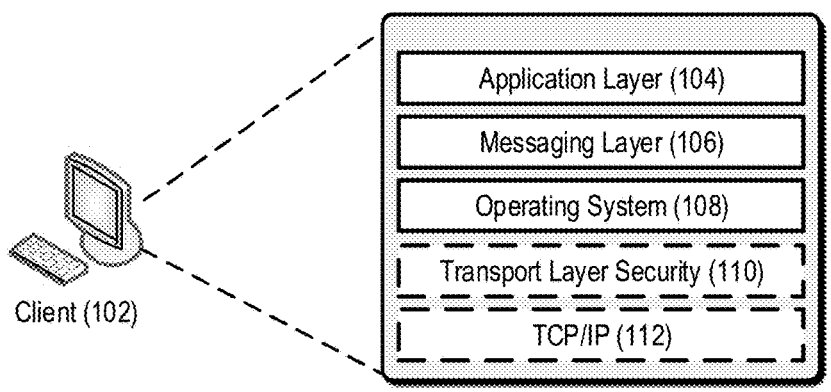
FIG. 1B illustrates functional layers of software on an example client device.

FIG. 1B illustrates functional layers of software on an example client device. A client device (e.g., client 102) is a data processing apparatus such as, for example, a personal computer, a laptop computer, a tablet computer, a smart phone, a smart watch, or a server computer. Other types of client devices are possible. The application layer 104 comprises the end-user application(s) that will integrate with the PubSub system 100. The messaging layer 106 is a programmatic interface for the application layer 104 to utilize services of the system 100 such as channel subscription, message publication, message retrieval, user authentication, and user authorization. In some implementations, the messages passed to and from the messaging layer 106 are encoded as JavaScript Object Notation (JSON) objects. Other message encoding schemes are possible.

The operating system 108 layer comprises the operating system software on the client 102. In various implementations, messages can be sent and received to/from the system 100 using persistent or non-persistent connections. Persistent connections can be created using, for example, network sockets. A transport protocol such as TCP/IP layer 112 implements the Transport Control Protocol/Internet Protocol communication with the system 100 that can be used by the messaging layer 106 to send messages over connections to the system 100. Other communication protocols are possible including, for example, User Datagram Protocol (UDP). In further implementations, an optional Transport Layer Security (TLS) layer 110 can be employed to ensure the confidentiality of the messages.

Figure 2:
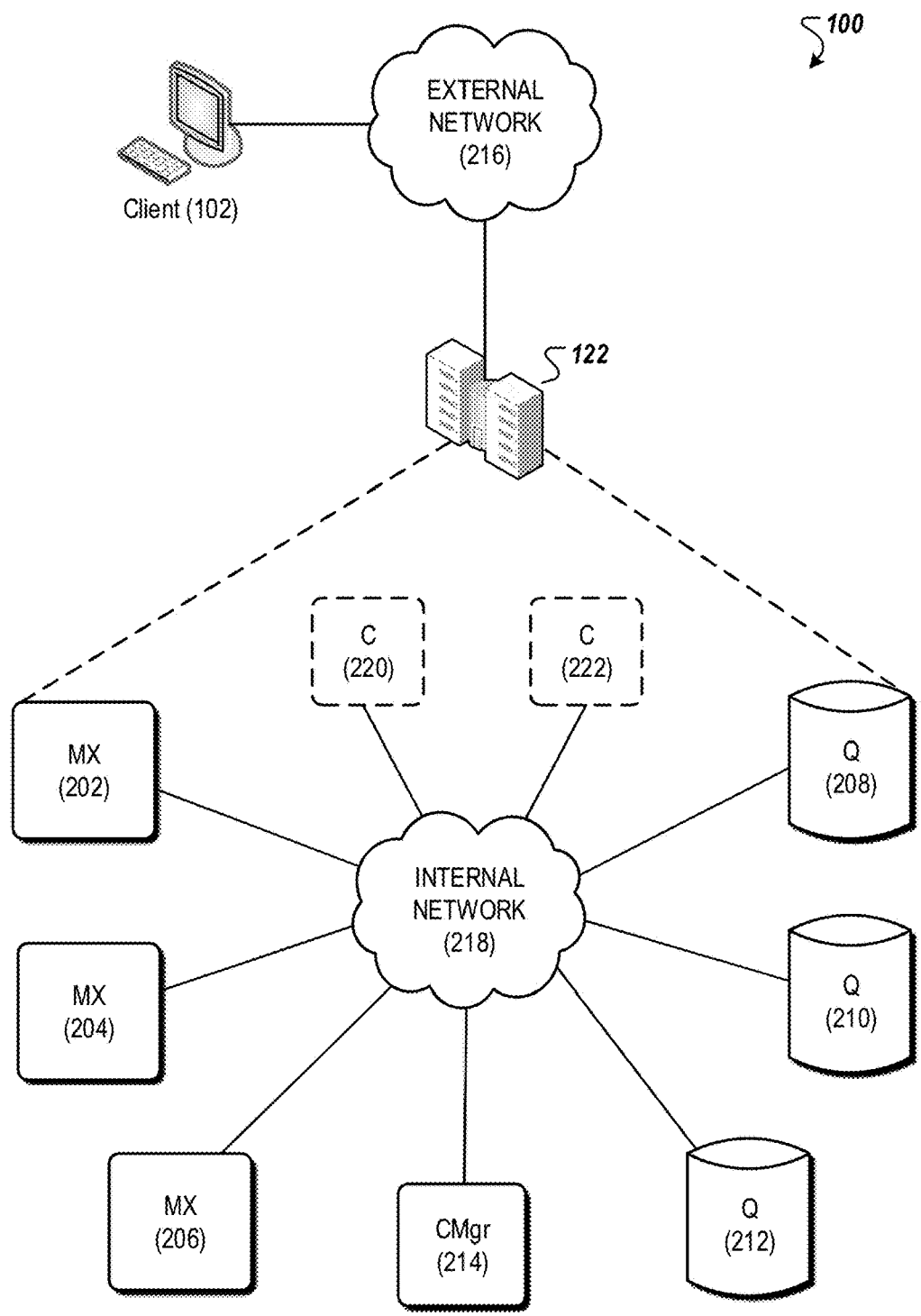
FIG. 2 is a diagram of an example messaging system.

FIG. 2 is a diagram of an example messaging system 100. The system 100 provides functionality for implementing PubSub communication patterns. The system comprises software components and storage that can be deployed at one or more data centers 122 in one or more geographic locations, for example. The system comprises MX nodes (e.g., MX nodes or multiplexer nodes 202, 204 and 206), Q nodes (e.g., Q nodes or queue nodes 208, 210 and 212), one or more configuration manager nodes (e.g., configuration manager 214), and optionally one or more C nodes (e.g., C nodes or cache nodes 220 and 222). Each node can execute in a virtual machine or on a physical machine (e.g., a data processing apparatus). Each MX node can serve as a termination point for one or more publisher and/or subscriber connections through the external network 216. The internal communication among MX nodes, Q nodes, C nodes, and the configuration manager can be conducted over an internal network 218, for example. By way of illustration, MX node 204 can be the terminus of a subscriber connection from client 102. Each Q node buffers channel data for consumption by the MX nodes. An ordered sequence of messages published to a channel is a logical channel stream. For example, if three clients publish messages to a given channel, the combined messages published by the clients comprise a channel stream. Messages can be ordered in a channel stream, for example, by time of publication by the client, by time of receipt by an MX node, or by time of receipt by a Q node. Other ways for ordering messages in a channel stream are possible. In the case where more than one message would be assigned to the same position in the order, one of the messages can be chosen (e.g., randomly) to have a later sequence in the order. Each configuration manager node is responsible for managing Q node load, for example, by assigning channels to Q nodes and/or splitting channel streams into so-called streamlets. Streamlets are discussed further below. The optional C nodes provide caching and load removal from the Q nodes.

In the example messaging system 100, one or more client devices (publishers and/or subscribers) establish respective persistent connections (e.g., TCP connections) to an MX node (e.g., MX node 204). The MX node serves as a termination point for these connections. For instance, external messages (e.g., between respective client devices and the MX node) carried by these connections can be encoded based on an external protocol (e.g., JSON). The MX node terminates the external protocol and translates the external messages to internal communication, and vice versa. The MX nodes publish and subscribe to streamlets on behalf of clients. In this way, an MX node can multiplex and merge requests of client devices subscribing for or publishing to the same channel, thus representing multiple client devices as one, instead of one by one.

In the example messaging system 100, a Q node (e.g., Q node 208) can store one or more streamlets of one or more channel streams. A streamlet is a data buffer for a portion of a channel stream. A streamlet will close to writing when its storage is full. A streamlet will close to reading and writing and be de-allocated when its time-to-live (TTL) has expired. By way of illustration, a streamlet can have a maximum size of 1 MB and a TTL of three minutes. Different channels can have streamlets limited by different sizes and/or by different TTLs. For example, streamlets in one channel can exist for up to three minutes, while streamlets in another channel can exist for up to 10 minutes. In various implementations, a streamlet corresponds to a computing process running on a Q node. The computing process can be terminated after the streamlet's TTL has expired, thus freeing up computing resources (for the streamlet) back to the Q node, for example.

When receiving a publish request from a client device, an MX node (e.g., MX node 204) makes a request to a configuration manager (e.g., configuration manager 214) to grant access to a streamlet to write the message being published. Note, however, that if the MX node has already been granted write access to a streamlet for the channel (and the channel has not been closed to writing), the MX node can write the message to that streamlet without having to request a grant to access the streamlet. Once a message is written to a streamlet for a channel, the message can be read by MX nodes and provided to subscribers of that channel.

Similarly, when receiving a channel subscription request from a client device, an MX node makes a request to a configuration manager to grant access to a streamlet for the channel from which messages are read. If the MX node has already been granted read access to a streamlet for the channel (and the channel's TTL has not been closed to reading), the MX node can read messages from the streamlet without having to request a grant to access the streamlet. The read messages can then be forwarded to client devices that have subscribed to the channel. In various implementations, messages read from streamlets are cached by MX nodes so that MX nodes can reduce the number of times needed to read from the streamlets.

By way of illustration, an MX node can request a grant from the configuration manager that allows the MX node to store a block of data into a streamlet on a particular Q node that stores streamlets of the particular channel. Example streamlet grant request and grant data structures are as follows:

```
StreamletGrantRequest = {
    "channel": string( )
    "mode": "read" | "write"
    "position": 0
}
StreamletGrantResponse = {
    "streamlet-id": "abcdef82734987",
    "limit-size": 2000000, # 2 megabytes max
    "limit-msgs": 5000, # 5 thousand messages max
    "limit-life": 4000, # the grant is valid for 4 seconds
    "q-node": string( )
    "position": 0
}
```

The StreamletGrantRequest data structure stores the name of the stream channel and a mode indicating whether the MX node intends on reading from or writing to the streamlet. The MX node sends the StreamletGrantRequest to a configuration manager node. The configuration manager node, in response, sends the MX node a StreamletGrantResponse data structure. The StreamletGrantResponse contains an identifier of the streamlet (streamlet-id), the maximum size of the streamlet (limit-size), the maximum number of messages that the streamlet can store (limit-msgs), the TTL (limit-life), and an identifier of a Q node (q-node) on which the streamlet resides. The StreamletGrantRequest and StreamletGrantResponse can also have a position field that points to a position in a streamlet (or a position in a channel) for reading from the streamlet.

A grant becomes invalid once the streamlet has closed. For example, a streamlet is closed to reading and writing once the streamlet's TTL has expired and a streamlet is closed to writing when the streamlet's storage is full. When a grant becomes invalid, the MX node can request a new grant from the configuration manager to read from or write to a streamlet. The new grant will reference a different streamlet and will refer to the same or a different Q node depending on where the new streamlet resides.

Figure 3A:
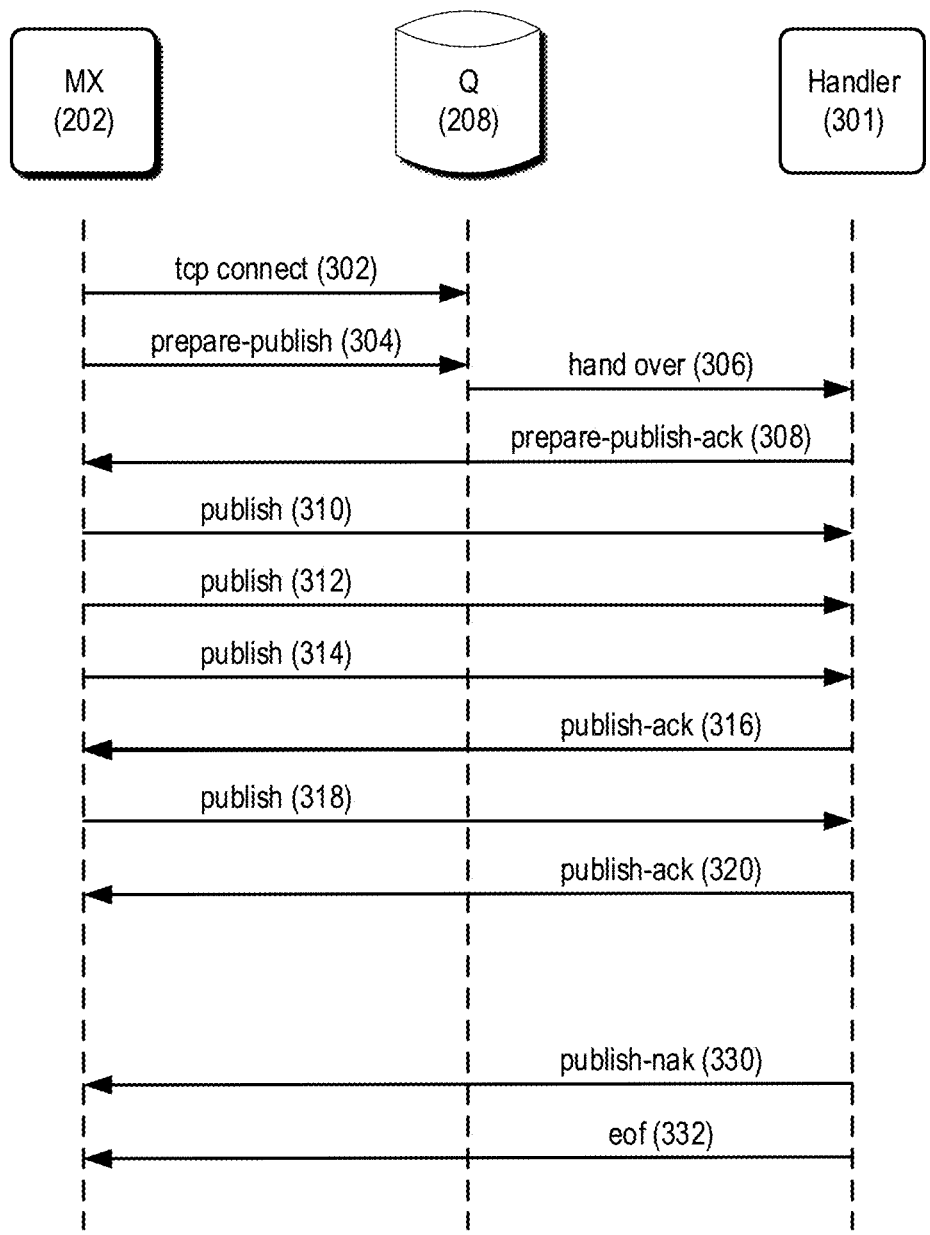
FIG. 3A is a data flow diagram of an example method for writing data to a streamlet.

FIG. 3A is a data flow diagram of an example method for writing data to a streamlet in various embodiments. In FIG. 3A, when an MX node (e.g., MX node 202) request to write to a streamlet is granted by a configuration manager (e.g., configuration manager 214), as described before, the MX node establishes a Transmission Control Protocol (TCP) connection with the Q node (e.g., Q node 208) identified in the grant response received from the configuration manager (302). A streamlet can be written concurrently by multiple write grants (e.g., for messages published by multiple publisher clients). Other types of connection protocols between the MX node and the Q node are possible.

The MX node then sends a prepare-publish message with an identifier of a streamlet that the MX node wants to write to the Q node (304). The streamlet identifier and Q node identifier can be provided by the configuration manager in the write grant as described earlier. The Q node hands over the message to a handler process 301 (e.g., a computing process running on the Q node) for the identified streamlet (306). The handler process can send to the MX node an acknowledgement (308). After receiving the acknowledgement, the MX node starts writing (publishing) messages (e.g., 310, 312, 314, and 318) to the handler process, which in turn stores the received data in the identified streamlet. The handler process can also send acknowledgements (316, 320) to the MX node for the received data. In some implementations, acknowledgements can be piggy-backed or cumulative. For example, the handler process can send to the MX node an acknowledgement for each predetermined amount of data received (e.g., for every 100 messages received) or for every predetermined time period (e.g., for every one millisecond). Other acknowledgement scheduling algorithms, such as Nagle's algorithm, can be used.

If the streamlet can no longer accept published data (e.g., when the streamlet is full), the handler process sends a Negative-Acknowledgement (NAK) message (330) indicating a problem, following by an EOF (end-of-file) message (332). In this way, the handler process closes the association with the MX node for the publish grant. The MX node can then request a write grant for another streamlet from a configuration manager if the MX node has additional messages to store.

Figure 3B:
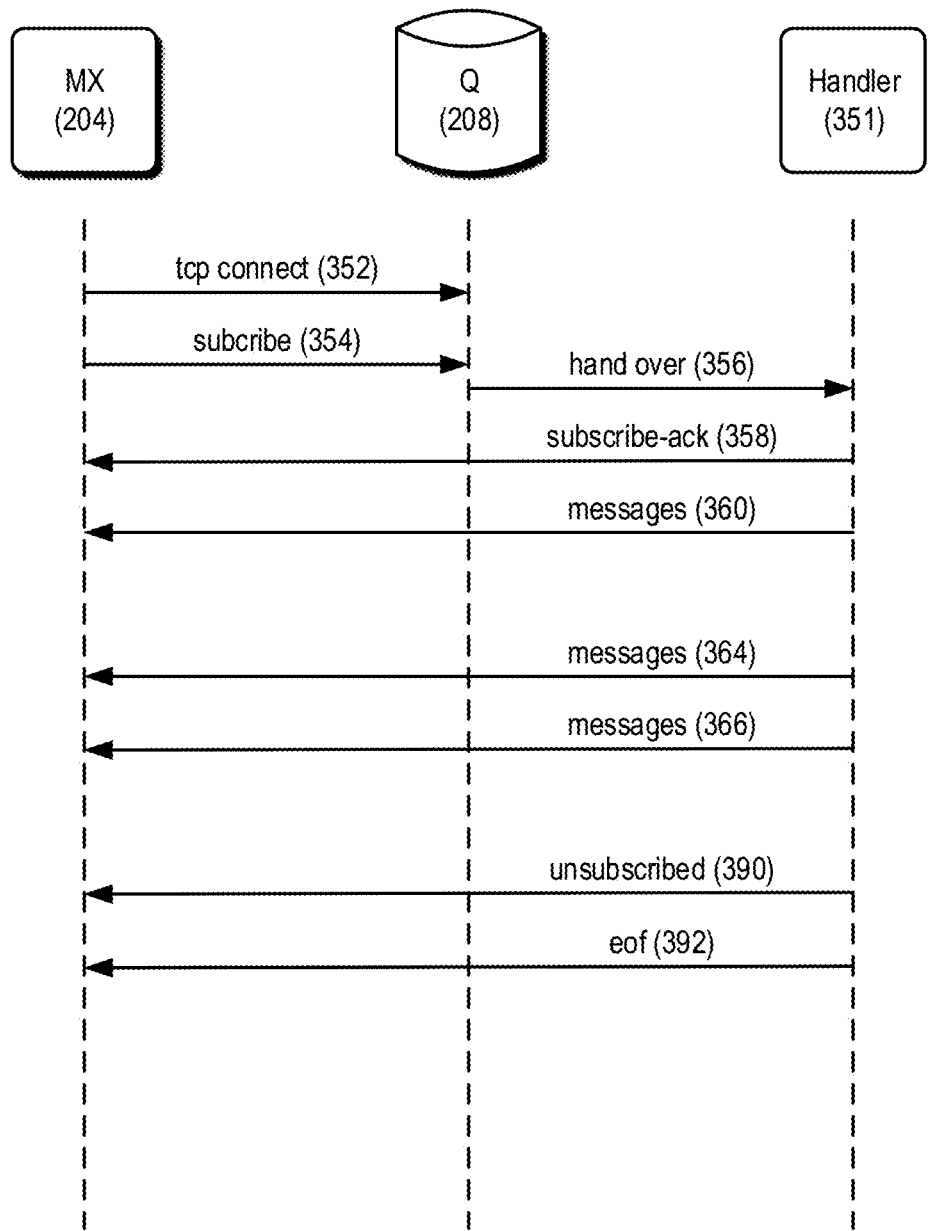
FIG. 3B is a data flow diagram of an example method for reading data from a streamlet.

FIG. 3B is a data flow diagram of an example method for reading data from a streamlet in various embodiments. In FIG. 3B, an MX node (e.g., MX node 204) sends to a configuration manager (e.g., configuration manager 214) a request for reading a particular channel starting from a particular message or time offset in the channel. The configuration manager returns to the MX node a read grant including an identifier of a streamlet containing the particular message, a position in the streamlet corresponding to the particular message, and an identifier of a Q node (e.g., Q node 208) containing the particular streamlet. The MX node then establishes a TCP connection with the Q node (352). Other types of connection protocols between the MX node and the Q node are possible.

The MX node then sends to the Q node a subscribe message (354) with the identifier of the streamlet (in the Q node) and the position in the streamlet from which the MX node wants to read (356). The Q node hands over the subscribe message to a handler process 351 for the streamlet (356). The handler process can send to the MX node an acknowledgement (358). The handler process then sends messages (360, 364, 366), starting at the position in the streamlet, to the MX node. In some implementations, the handler process can send all of the messages in the streamlet to the MX node. After sending the last message in a particular streamlet, the handler process can send a notification of the last message to the MX node. The MX node can send to the configuration manager another request for another streamlet containing a next message in the particular channel.

If the particular streamlet is closed (e.g., after its TTL has expired), the handler process can send an unsubscribe message (390), followed by an EOF message (392), to close the association with the MX node for the read grant. The MX node can close the association with the handler process when the MX node moves to another streamlet for messages in the particular channel (e.g., as instructed by the configuration manager). The MX node can also close the association with the handler process if the MX node receives an unsubscribe message from a corresponding client device.

In various implementations, a streamlet can be written into and read from at the same time instance. For example, there can be a valid read grant and a valid write grant at the same time instance. In various implementations, a streamlet can be read concurrently by multiple read grants (e.g., for channels subscribed to by multiple publisher clients). The handler process of the streamlet can order messages from concurrent write grants based on, for example, time-of-arrival, and store the messages based on the order. In this way, messages published to a channel from multiple publisher clients can be serialized and stored in a streamlet of the channel.

In the messaging system 100, one or more C nodes (e.g., C node 220) can offload data transfers from one or more Q nodes. For instance, if there are many MX nodes requesting streamlets from Q nodes for a particular channel, the streamlets can be offloaded and cached in one or more C nodes. The MX nodes (e.g., as instructed by read grants from a configuration manager) can read the streamlets from the C nodes instead.

As described above, messages for a channel in the messaging system 100 are ordered in a channel stream. A configuration manager (e.g., configuration manager 214) splits the channel stream into fixed-sized streamlets that each reside on a respective Q node. In this way, storing a channel stream can be shared among many Q nodes; each Q node stores a portion (one or more streamlets) of the channel stream. More particularly, a streamlet can be stored in, for example, registers and/or dynamic memory elements associated with a computing process on a Q node, thus avoiding the need to access persistent, slower storage devices such as hard disks. This results in faster message access. The configuration manager can also balance load among Q nodes in the messaging system 100 by monitoring respective workloads of the Q nodes and allocating streamlets in a way that avoids overloading any one Q node.

In various implementations, a configuration manager maintains a list identifying each active streamlet, the respective Q node on which the streamlet resides, an identification of the position of the first message in the streamlet, and whether the streamlet is closed for writing. In some implementations, Q nodes notify the configuration manager and/or any MX nodes that are publishing to a streamlet that the streamlet is closed due to being full or when the streamlet's TTL has expired. When a streamlet is closed, the streamlet remains on the configuration manager's list of active streamlets until the streamlet's TTL has expired so that MX nodes can continue to retrieve messages from the streamlet.

When an MX node requests a write grant for a given channel and there is not a streamlet for the channel that can be written to, the configuration manager allocates a new streamlet on one of the Q nodes and returns the identity of the streamlet and the Q node in the StreamletGrantResponse. Otherwise, the configuration manager returns the identity of the currently open for writing streamlet and corresponding Q node in the StreamletGrantResponse. MX nodes can publish messages to the streamlet until the streamlet is full or the streamlet's TTL has expired, after which a new streamlet can be allocated by the configuration manager.

When an MX node requests a read grant for a given channel and there is not a streamlet for the channel that can be read from, the configuration manager allocates a new streamlet on one of the Q nodes and returns the identity of the streamlet and the Q node in the StreamletGrantResponse. Otherwise, the configuration manager returns the identity of the streamlet and Q node that contains the position from which the MX node wishes to read. The Q node can then begin sending messages to the MX node from the streamlet beginning at the specified position until there are no more messages in the streamlet to send. When a new message is published to a streamlet, MX nodes that have subscribed to that streamlet will receive the new message. If a streamlet's TTL has expired, the handler process 351 can send an EOF message (392) to any MX nodes that are subscribed to the streamlet.

In some implementations, the messaging system 100 can include multiple configuration managers (e.g., configuration manager 214 plus one or more other configuration managers). Multiple configuration managers can provide resiliency and prevent single point of failure. For instance, one configuration manager can replicate lists of streamlets and current grants it maintains to another "slave" configuration manager. As another example, multiple configuration managers can coordinate operations between them using distributed consensus protocols, such as, for example, Paxos or Raft protocols.

Figure 4A:
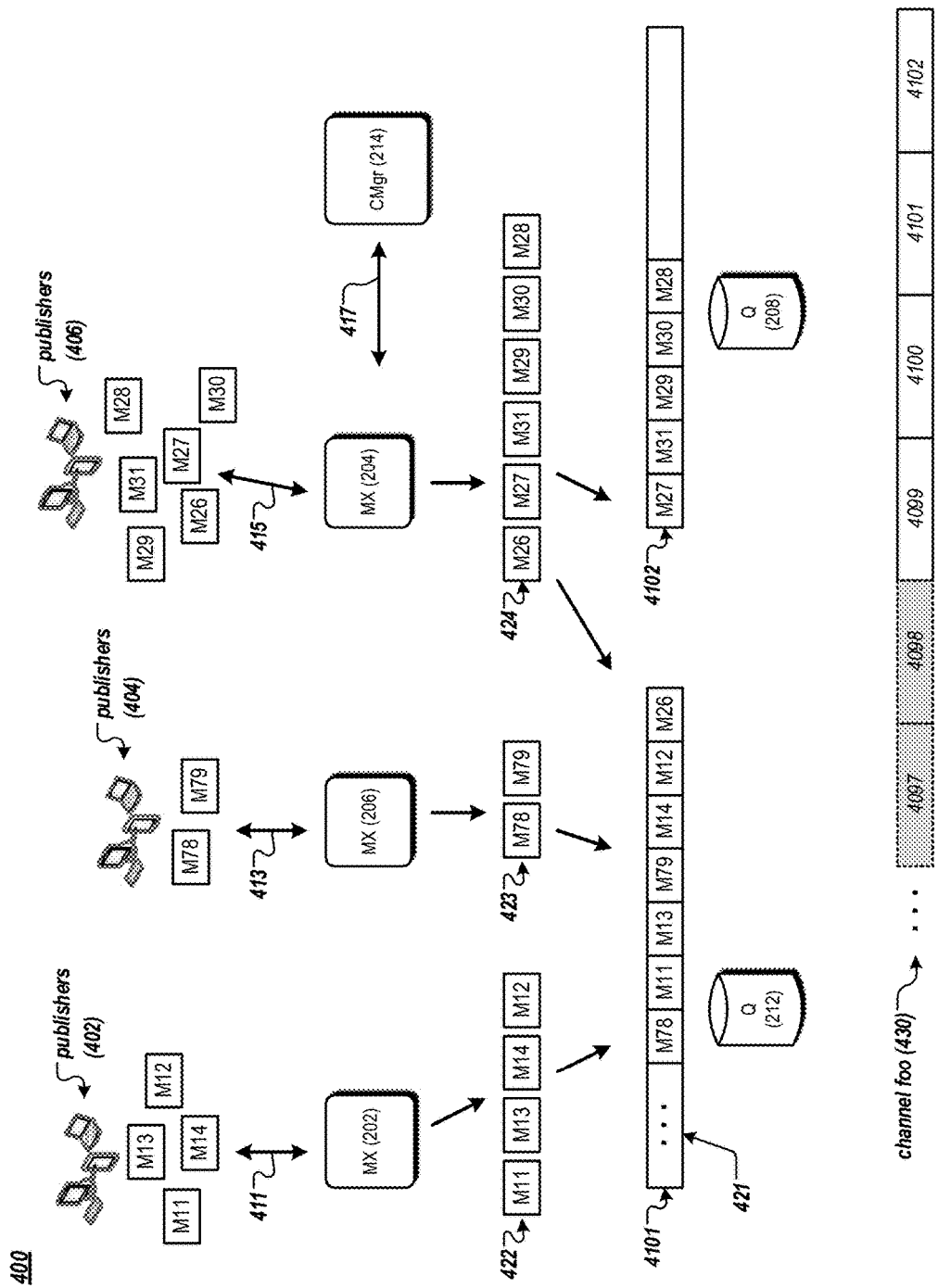
FIG. 4A is a data flow diagram of an example method for publishing messages to a channel of a messaging system.

FIG. 4A is a data flow diagram of an example method for publishing messages to a channel of a messaging system. In FIG. 4A, publishers (e.g., publisher clients 402, 404, 406) publish messages to the messaging system 100 described earlier in reference to FIG. 2. For instance, publishers 402 respectively establish connections 411 and send publish requests to the MX node 202. Publishers 404 respectively establish connections 413 and send publish requests to the MX node 206. Publishers 406 respectively establish connections 415 and send publish requests to the MX node 204. Here, the MX nodes can communicate (417) with a configuration manager (e.g., configuration manager 214) and one or more Q nodes (e.g., Q nodes 212 and 208) in the messaging system 100 via the internal network 218.

By way of illustration, each publish request (e.g., in JSON key/value pairs) from a publisher to an MX node includes a channel name and a message. The MX node (e.g., MX node 202) can assign the message in the publish request to a distinct channel in the messaging system 100 based on the channel name (e.g., "foo") of the publish request. The MX node can confirm the assigned channel with the configuration manager 214. If the channel (specified in the subscribe request) does not yet exist in the messaging system 100, the configuration manager can create and maintain a new channel in the messaging system 100. For instance, the configuration manager can maintain a new channel by maintaining a list identifying each active streamlet of the channel's stream, the respective Q node on which the streamlet resides, and identification of the positions of the first and last messages in the streamlet as described earlier.

For messages of a particular channel, the MX node can store the messages in one or more buffers or streamlets in the messaging system 100. For instance, the MX node 202 receives from the publishers 402 requests to publish messages M11, M12, M13, and M14 to a channel foo. The MX node 206 receives from the publishers 404 requests to publish messages M78 and M79 to the channel foo. The MX node 204 receives from the publishers 406 requests to publish messages M26, M27, M28, M29, M30, and M31 to the channel foo.

The MX nodes can identify one or more streamlets for storing messages for the channel foo. As described earlier, each MX node can request a write grant from the configuration manager 214 that allows the MX node to store the messages in a streamlet of the channel foo. For instance, the MX node 202 receives a grant from the configuration manager 214 to write messages M11, M12, M13, and M14 to a streamlet 4101 on the Q node 212. The MX node 206 receives a grant from the configuration manager 214 to write messages M78 and M79 to the streamlet 4101. Here, the streamlet 4101 is the last one (at the moment) of a sequence of streamlets of the channel stream 430 storing messages of the channel foo. The streamlet 4101 has messages (421) of the channel foo that were previously stored in the streamlet 4101, but is still open, i.e., the streamlet 4101 still has space for storing more messages and the streamlet's TTL has not expired.

The MX node 202 can arrange the messages for the channel foo based on the respective time that each message was received by the MX node 202, e.g., M11, M13, M14, M12 (422), and store the received messages as arranged in the streamlet 4101. That is, the MX node 202 receives M11 first, followed by M13, M14, and M12. Similarly, the MX node 206 can arrange the messages for the channel foo based on their respective time that each message was received by the MX node 206, e.g., M78, M79 (423), and store the received messages as arranged in the streamlet 4101. Other arrangements or ordering of the messages for the channel are possible.

The MX node 202 (or MX node 206) can store the received messages using the method for writing data to a streamlet described earlier in reference to FIG. 3A, for example. In various implementations, the MX node 202 (or MX node 206) can buffer (e.g., in a local data buffer) the received messages for the channel foo and store the received messages in a streamlet for the channel foo (e.g., streamlet 4101) when the buffered messages reach a predetermined number or size (e.g., 100 messages) or when a predetermined time (e.g., 50 milliseconds) has elapsed. For instance, the MX node 202 can store in the streamlet 100 messages at a time or in every 50 milliseconds. Other appropriate algorithms and techniques, such as Nagle's algorithm, can be used for managing the buffered messages.

In various implementations, the Q node 212 (e.g., a handler process) stores the messages of the channel foo in the streamlet 4101 in the order as arranged by the MX node 202 and MX node 206. The Q node 212 stores the messages of the channel foo in the streamlet 4101 in the order the Q node 212 receives the messages. For instance, assume that the Q node 212 receives messages M78 (from the MX node 206) first, followed by messages M11 and M13 (from the MX node 202), M79 (from the MX node 206), and M14 and M12 (from the MX node 202). The Q node 212 stores in the streamlet 4101 the messages in the order as received, e.g., M78, M11, M13, M79, M14, and M12, immediately after the messages 421 that are already stored in the streamlet 4101. In this way, messages published to the channel foo from multiple publishers (e.g., 402, 404) can be serialized in a particular order and stored in the streamlet 4101 of the channel foo. Different subscribers that subscribe to the channel foo will receive messages of the channel foo in the same particular order, as will be described in more detail in reference to FIG. 4B.

In the example of FIG. 4A, at a time instance after the message M12 was stored in the streamlet 4101, the MX node 204 requests a grant from the configuration manager 214 to write to the channel foo. The configuration manager 214 provides the MX node 204 a grant to write messages to the streamlet 4101, as the streamlet 4101 is still open for writing. The MX node 204 arranges the messages for the channel foo based on the respective time that each message was received by the MX node 204, e.g., M26, M27, M31, M29, M30, M28 (424), and stores the messages as arranged for the channel foo.

By way of illustration, assume that the message M26 is stored to the last available position of the streamlet 4101. As the streamlet 4101 is now full, the Q node 212 sends to the MX node 204 a NAK message, following by an EOF message, to close the association with the MX node 204 for the write grant, as described earlier in reference to FIG. 3A. The MX node 204 then requests another write grant from the configuration manager 214 for additional messages (e.g., M27, M31, and so on) for the channel foo.

The configuration manager 214 can monitor available Q nodes in the messaging system 100 for their respective workloads (e.g., how many streamlets are residing in each Q node). The configuration manager 214 can allocate a streamlet for the write request from the MX node 204 such that overloading (e.g., too many streamlets or too many read or write grants) can be avoided for any given Q node. For instance, the configuration manager 214 can identify a least loaded Q node in the messaging system 100 and allocate a new streamlet on the least loaded Q node for write requests from the MX node 204. In the example of FIG. 4A, the configuration manager 214 allocates a new streamlet 4102 on the Q node 208 and provides a write grant to the MX node 204 to write messages for the channel foo to the streamlet 4102. As shown in FIG. 4A, the Q node stores in the streamlet 4102 the messages from the MX node 204 in an order as arranged by the MX node 204: M27, M31, M29, M30, and M28 (assuming that there is no other concurrent write grant for the streamlet 4102 at the moment).

When the configuration manager 214 allocates a new streamlet (e.g., streamlet 4102) for a request for a grant from an MX node (e.g., MX node 204) to write to a channel (e.g., foo), the configuration manager 214 assigns to the streamlet its TTL, which will expire after TTLs of other streamlets that are already in the channel's stream. For instance, the configuration manager 214 can assign to each streamlet of the channel foo's channel stream a TTL of 3 minutes when allocating the streamlet. That is, each streamlet will expire 3 minutes after it is allocated (created) by the configuration manager 214. Since a new streamlet is allocated after a previous streamlet is closed (e.g., filled entirely or expired), in this way, the channel foo's channel stream comprises streamlets that each expires sequentially after its previous streamlet expires. For instance, as shown in an example channel stream 430 of the channel foo in FIG. 4A, streamlet 4098 and streamlets before 4098 have expired (as indicated by the dotted-lined gray-out boxes). Messages stored in these expired streamlets are not available for reading for subscribers of the channel foo. Streamlets 4099, 4100, 4101, and 4102 are still active (not expired). The streamlets 4099, 4100, and 4101 are closed for writing, but still are available for reading. The streamlet 4102 is available for reading and writing, at the moment when the message M28 was stored in the streamlet 4102. At a later time, the streamlet 4099 will expire, following by the streamlets 4100, 4101, and so on.

Figure 4B:
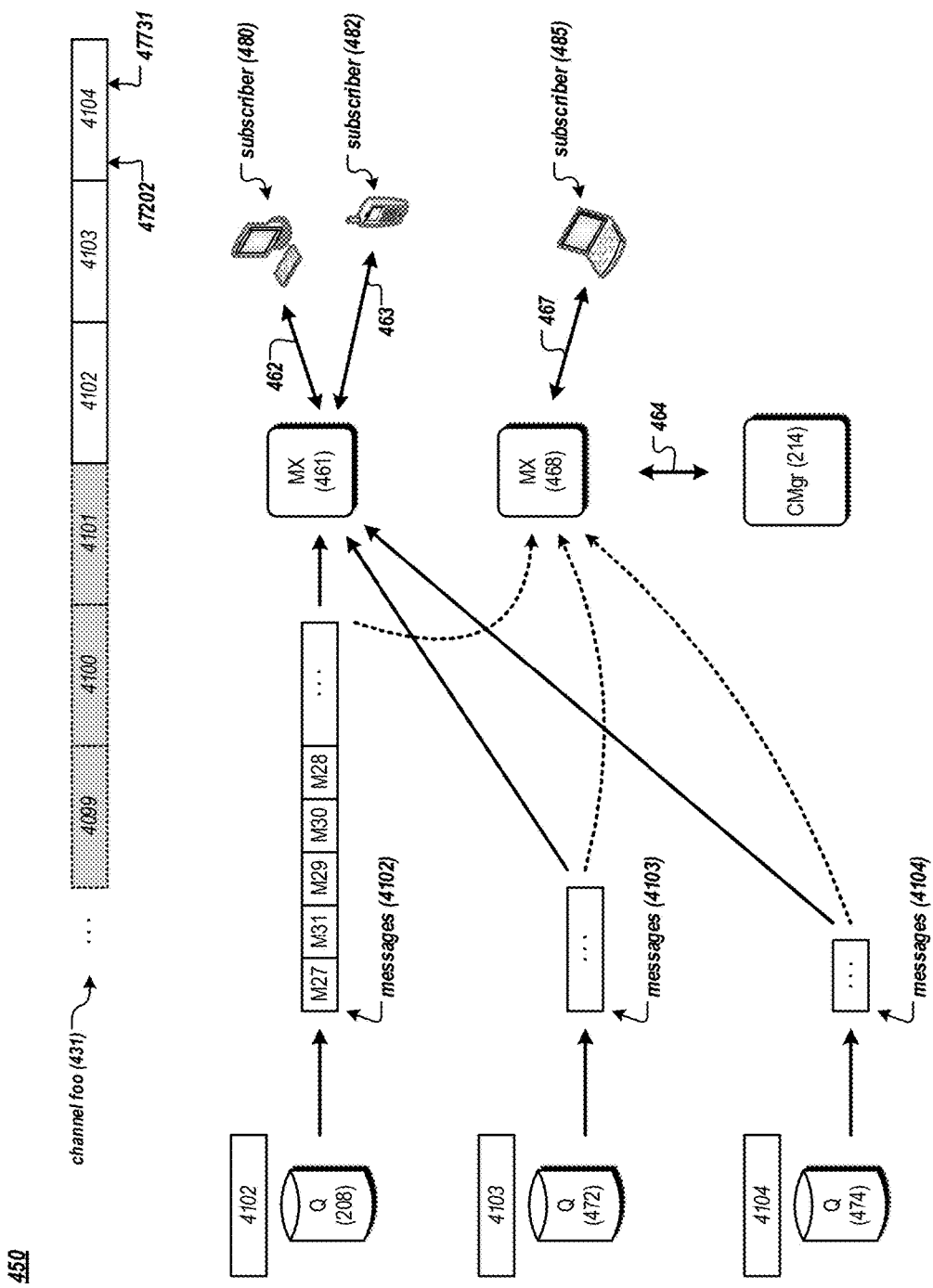
FIG. 4B is a data flow diagram of an example method for subscribing to a channel of a messaging system.

FIG. 4B is a data flow diagram of an example method for subscribing to a channel of a messaging system. In FIG. 4B, a subscriber 480 establishes a connection 462 with an MX node 461 of the messaging system 100. Subscriber 482 establishes a connection 463 with the MX node 461. Subscriber 485 establishes a connection 467 with an MX node 468 of the messaging system 100. Here, the MX nodes 461 and 468 can respectively communicate (464) with the configuration manager 214 and one or more Q nodes in the messaging system 100 via the internal network 218.

A subscriber (e.g., subscriber 480) can subscribe to the channel foo of the messaging system 100 by establishing a connection (e.g., 462) and sending a request for subscribing to messages of the channel foo to an MX node (e.g., MX node 461). The request (e.g., in JSON key/value pairs) can include a channel name, such as, for example, "foo." When receiving the subscribe request, the MX node 461 can send to the configuration manager 214 a request for a read grant for a streamlet in the channel foo's channel stream.

By way of illustration, assume that at the current moment the channel foo's channel stream 431 includes active streamlets 4102, 4103, and 4104, as shown in FIG. 4B. The streamlets 4102 and 4103 each are full. The streamlet 4104 stores messages of the channel foo, including the last message (at the current moment) stored at a position 47731. Streamlets 4101 and streamlets before 4101 are invalid, as their respective TTLs have expired. Note that the messages M78, M11, M13, M79, M14, M12, and M26 stored in the streamlet 4101, described earlier in reference to FIG. 4A, are no longer available for subscribers of the channel foo, since the streamlet 4101 is no longer valid, as its TTL has expired. As described earlier, each streamlet in the channel foo's channel stream has a TTL of 3 minutes, thus only messages (as stored in streamlets of the channel foo) that are published to the channel foo (i.e., stored into the channel's streamlets) no earlier than 3 minutes from the current time can be available for subscribers of the channel foo.

The MX node 461 can request a read grant for all available messages in the channel foo, for example, when the subscriber 480 is a new subscriber to the channel foo. Based on the request, the configuration manager 214 provides the MX node 461 a read grant to the streamlet 4102 (on the Q node 208) that is the earliest streamlet in the active streamlets of the channel foo (i.e., the first in the sequence of the active streamlets). The MX node 461 can retrieve messages in the streamlet 4102 from the Q node 208, using the method for reading data from a streamlet described earlier in reference to FIG. 3B, for example. Note that the messages retrieved from the streamlet 4102 maintain the same order as stored in the streamlet 4102. However, other arrangements or ordering of the messages in the streamlet are possible. In various implementations, when providing messages stored in the streamlet 4102 to the MX node 461, the Q node 208 can buffer (e.g., in a local data buffer) the messages and send the messages to the MX node 461 when the buffer messages reach a predetermined number or size (e.g., 200 messages) or a predetermined time (e.g., 50 milliseconds) has elapsed. For instance, the Q node 208 can send the channel foo's messages (from the streamlet 4102) to the MX node 461 200 messages at a time or in every 50 milliseconds. Other appropriate algorithms and techniques, such as Nagle's algorithm, can be used for managing the buffered messages.

After receiving the last message in the streamlet 4102, the MX node 461 can send an acknowledgement to the Q node 208, and send to the configuration manager 214 another request (e.g., for a read grant) for the next streamlet in the channel stream of the channel foo. Based on the request, the configuration manager 214 provides the MX node 461 a read grant to the streamlet 4103 (on Q node 472) that logically follows the streamlet 4102 in the sequence of active streamlets of the channel foo. The MX node 461 can retrieve messages stored in the streamlet 4103, e.g., using the method for reading data from a streamlet described earlier in reference to FIG. 3B, until it retrieves the last message stored in the streamlet 4103. The MX node 461 can send to the configuration manager 214 yet another request for a read grant for messages in the next streamlet 4104 (on Q node 474). After receiving the read grant, the MX node 461 retrieves messages of the channel foo stored in the streamlet 4104, until the last message at the position 47731. Similarly, the MX node 468 can retrieve messages from the streamlets 4102, 4103, and 4104 (as shown with dotted arrows in FIG. 4B), and provide the messages to the subscriber 485.

The MX node 461 can send the retrieved messages of the channel foo to the subscriber 480 (via the connection 462) while receiving the messages from the Q nodes 208, 472, or 474. In various implementations, the MX node 461 can store the retrieved messages in a local buffer. In this way, the retrieved messages can be provided to another subscriber (e.g., subscriber 482) when the other subscriber subscribes to the channel foo and requests the channel's messages. The MX node 461 can remove messages stored in the local buffer that each has a time of publication that has exceeded a predetermined time period. For instance, the MX node 461 can remove messages (stored in the local buffer) with respective times of publication exceeding 3 minutes. In some implementations, the predetermined time period for keeping messages in the local buffer on MX node 461 can be the same as or similar to the time-to-live duration of a streamlet in the channel foo's channel stream, since at a given moment, messages retrieved from the channel's stream do not include those in streamlets having respective times-to-live that had already expired.

The messages retrieved from the channel stream 431 and sent to the subscriber 480 (by the MX node 461) are arranged in the same order as the messages were stored in the channel stream, although other arrangements or ordering of the messages are possible. For instance, messages published to the channel foo are serialized and stored in the streamlet 4102 in a particular order (e.g., M27, M31, M29, M30, and so on), then stored subsequently in the streamlet 4103 and the streamlet 4104. The MX node retrieves messages from the channel stream 431 and provides the retrieved messages to the subscriber 480 in the same order as the messages are stored in the channel stream: M27, M31, M29, M30, and so on, followed by ordered messages in the streamlet 4103, and followed by ordered messages in the streamlet 4104.

Instead of retrieving all available messages in the channel stream 431, the MX node 461 can request a read grant for messages stored in the channel stream 431 starting from a message at particular position, e.g., position 47202. For instance, the position 47202 can correspond to an earlier time instance (e.g., 10 seconds before the current time) when the subscriber 480 was last subscribing to the channel foo (e.g., via a connection to the MX node 461 or another MX node of the messaging system 100). The MX node 461 can send to the configuration manager 214 a request for a read grant for messages starting at the position 47202. Based on the request, the configuration manager 214 provides the MX node 461 a read grant to the streamlet 4104 (on the Q node 474) and a position on the streamlet 4104 that corresponds to the channel stream position 47202. The MX node 461 can retrieve messages in the streamlet 4104 starting from the provided position, and send the retrieved messages to the subscriber 480.

As described above in reference to FIGS. 4A and 4B, messages published to the channel foo are serialized and stored in the channel's streamlets in a particular order. The configuration manager 214 maintains the ordered sequence of streamlets as they are created throughout their respective times-to-live. Messages retrieved from the streamlets by an MX node (e.g., MX node 461, or MX node 468) and provided to a subscriber can be, in some implementations, in the same order as the messages are stored in the ordered sequence of streamlets. In this way, messages sent to different subscribers (e.g., subscriber 480, subscriber 482, or subscriber 485) can be in the same order (as the messages are stored in the streamlets), regardless which MX nodes the subscribers are connected to.

In various implementations, a streamlet stores messages in a set of blocks of messages. Each block stores a number of messages. For instance, a block can store two hundred kilobytes of messages (although other sizes of blocks of messages are possible). Each block has its own time-to-live, which can be shorter than the time-to-live of the streamlet holding the block. Once a block's TTL has expired, the block can be discarded from the streamlet holding the block, as described in more detail below in reference to FIG. 4C.

Figure 4C:
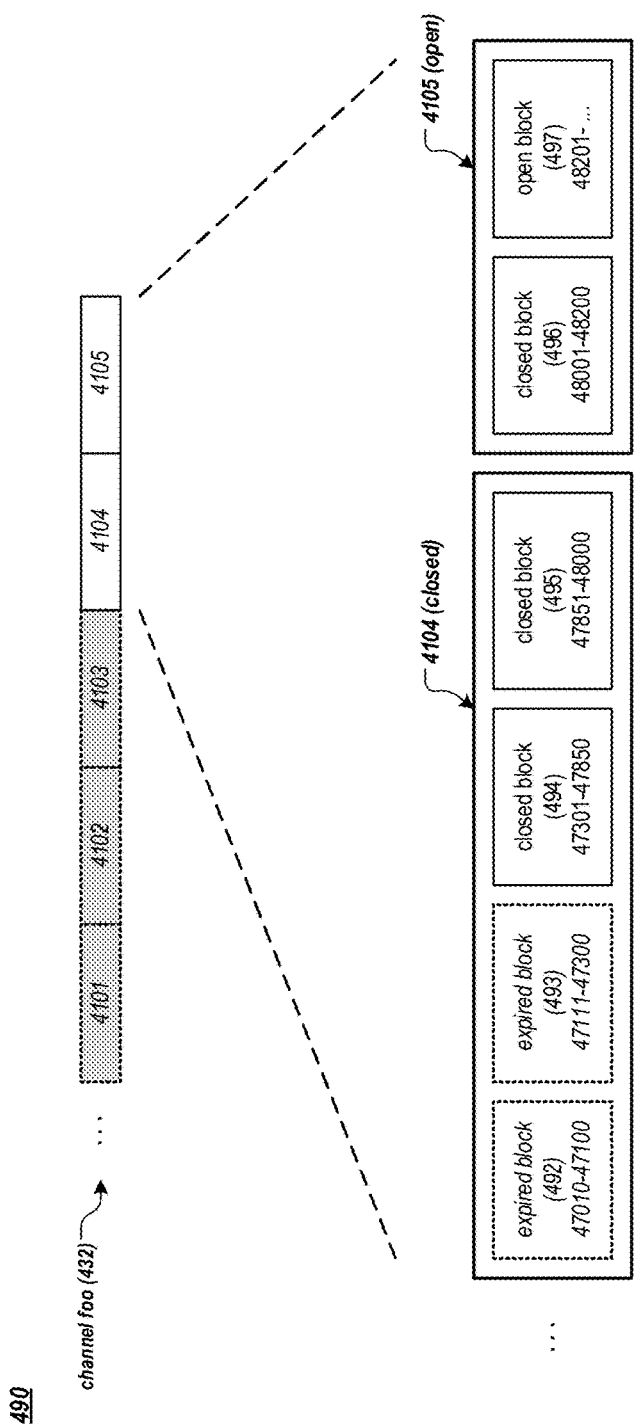
FIG. 4C is an example data structure for storing messages of a channel of a messaging system.

FIG. 4C is an example data structure for storing messages of a channel of a messaging system. As described with the channel foo in reference to FIGS. 4A and 4B, assume that at the current moment the channel foo's channel stream 432 includes active streamlets 4104 and 4105, as shown in FIG. 4C. Streamlet 4103 and streamlets before 4103 are invalid, as their respective TTLs have expired. The streamlet 4104 is already full for its capacity (e.g., as determined by a corresponding write grant) and is closed for additional message writes. The streamlet 4104 is still available for message reads. The streamlet 4105 is open and is available for message writes and reads.

By way of illustration, the streamlet 4104 (e.g., a computing process running on the Q node 474 shown in FIG. 4B) currently holds two blocks of messages. Block 494 holds messages from channel positions 47301 to 47850. Block 495 holds messages from channel positions 47851 to 48000. The streamlet 4105 (e.g., a computing process running on another Q node in the messaging system 100) currently holds two blocks of messages. Block 496 holds messages from channel positions 48001 to 48200. Block 497 holds messages starting from channel position 48201, and still accepts additional messages of the channel foo.

When the streamlet 4104 was created (e.g., by a write grant), a first block (sub-buffer) 492 was created to store messages, e.g., from channel positions 47010 to 47100. Later on, after the block 492 had reached its capacity, another block 493 was created to store messages, e.g., from channel positions 47111 to 47300. Blocks 494 and 495 were subsequently created to store additional messages. Afterwards, the streamlet 4104 was closed for additional message writes, and the streamlet 4105 was created with additional blocks for storing additional messages of the channel foo.

In this example, the respective TTL's of blocks 492 and 493 had expired. The messages stored in these two blocks (from channel positions 47010 to 47300) are no longer available for reading by subscribers of the channel foo. The streamlet 4104 can discard these two expired blocks, e.g., by de-allocating the memory space for the blocks 492 and 493.

The blocks 494 or 495 could become expired and be discarded by the streamlet 4104, before the streamlet 4104 itself becomes invalid. Alternatively, streamlet 4104 itself could become invalid before the blocks 494 or 495 become expired. In this way, a streamlet can hold one or more blocks of messages, or contain no block of messages, depending on respective TTLs of the streamlet and blocks, for example.

A streamlet, or a computing process running on a Q node in the messaging system 100, can create a block for storing messages of a channel by allocating a certain size of memory space from the Q node. The streamlet can receive, from an MX node in the messaging system 100, one message at a time and store the received message in the block. Alternatively, the MX node can assemble (i.e., buffer) a group of messages and send the group of messages to the Q node. The streamlet can allocate a block of memory space (from the Q node) and store the group of messages in the block. The MX node can also perform compression on the group of messages, e.g., by removing a common header from each message or performing other suitable compression techniques.

As described above, a streamlet (a data buffer) residing on a Q node stores messages of a channel in the messaging system 100. To prevent failure of the Q node (a single point failure) that can cause messages being lost, the messaging system 100 can replicate messages on multiple Q nodes, as described in more detail below.

Figure 5A:
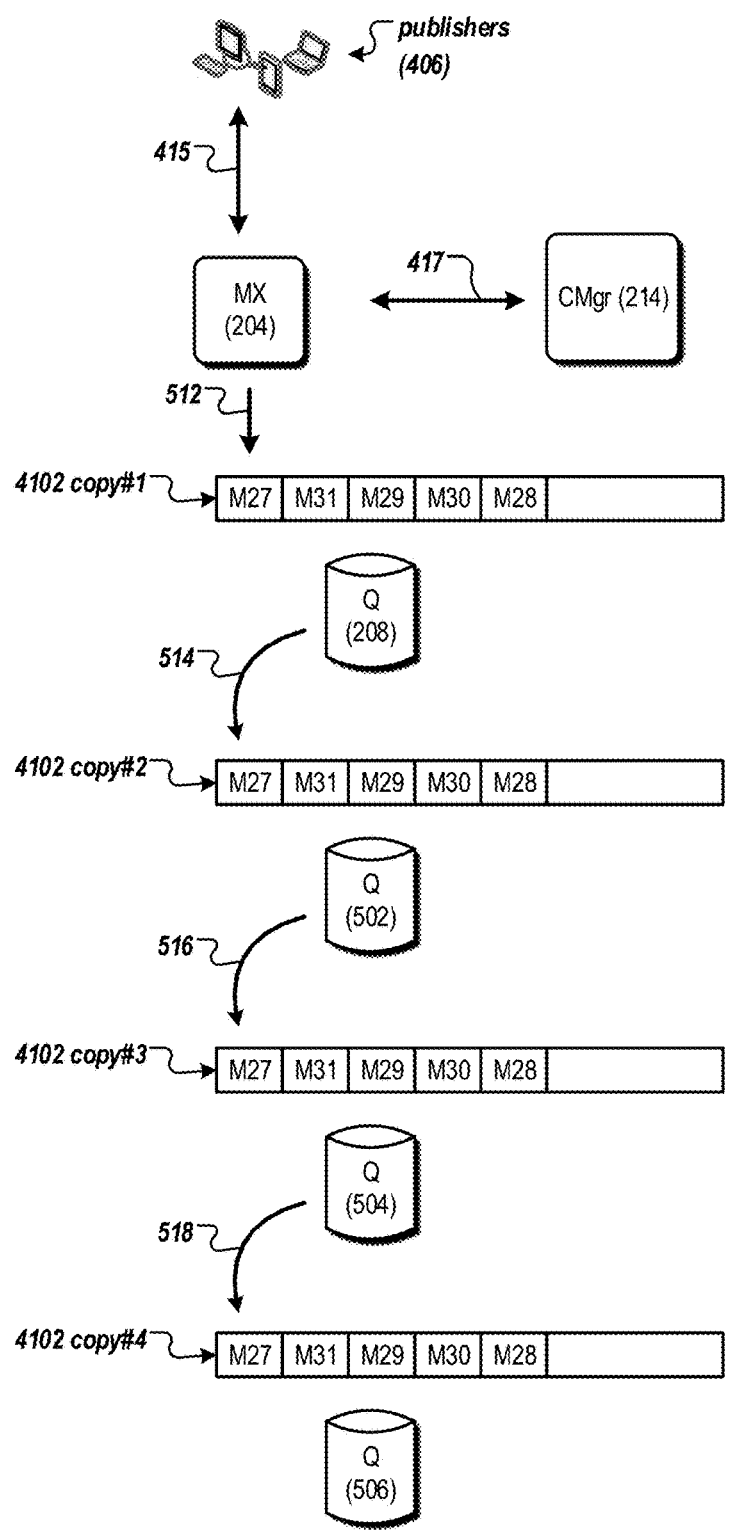
FIG. 5A is a data flow diagram of an example method for publishing and replicating messages of a messaging system.

FIG. 5A is a data flow diagram of an example method 500 for publishing and replicating messages of the messaging system 100. As described earlier in reference to FIG. 4A, the MX node 204 receives messages (of the channel foo) from the publishers 406. The configuration manager 214 can instruct the MX Node 204 (e.g., with a write grant) to store the messages in the streamlet 4102 on the Q node 208. In FIG. 5A, instead of storing the messages on a single node (e.g., Q node 208), the configuration manager 214 allocates multiple Q nodes to store multiple copies of the streamlet 4102 on these Q nodes.

By way of illustration, the configuration manager 214 allocates Q nodes 208, 502, 504, and 506 in the messaging system 100 to store copies of the streamlet 4102. The configuration manager 214 instructs the MX node 204 to transmit the messages for the channel foo (e.g., messages M27, M31, M29, M30, and M28) to the Q node 208 (512). A computing process running on the Q node 208 stores the messages in the first copy (copy #1) of the streamlet 4102. Instead of sending an acknowledgement message to the MX node 204 after storing the messages, the Q node 208 forwards the messages to the Q node 502 (514). A computing process running on the Q node 502 stores the messages in another copy (copy #2) of the streamlet 4102. Meanwhile, the Q node 502 forwards the messages to the Q node 504 (516). A computing process running on the Q node 504 stores the messages in yet another copy (copy #3) of the streamlet 4102. The Q node 504 also forwards the message to the Q node 506 (518). A computing process running on the Q node 506 stores the messages in yet another copy (copy #4) of the streamlet 4102. The Q node 506 can send an acknowledgement message to the MX node 204, indicating that all the messages (M27, M31, M29, M30, and M28) have been stored successfully in streamlet copies #1, #2, #3 and #4.

In some implementations, after successfully storing the last copy (copy #4), the Q node 506 can send an acknowledgement to its upstream Q node (504), which in turns sends an acknowledgement to its upstream Q node (502), and so on, until the acknowledgement is sent to the Q node 208 storing the first copy (copy #1). The Q node 208 can send an acknowledgement message to the MX node 204, indicating that all messages have been stored successfully in the streamlet 4102 (i.e., in the copies #1, #2, #3 and #4).

In this way, four copies of the streamlet 4102 (and each message in the streamlet) are stored in four different Q nodes. Other numbers (e.g., two, three, five, or other suitable number) of copies of a streamlet are also possible. In the present illustration, the four copies form a chain of copies including a head copy in the copy #1 and a tail copy in the copy #4. When a new message is published to the streamlet 4102, the message is first stored in the head copy (copy #1) on the Q node 208. The message is then forwarded downstream to the next adjacent copy, the copy #2 on the Q node 502 for storage, then to the copy #3 on the Q node 504 for storage, until the message is stored in the tail copy the copy #4 on the Q node 506.

In addition to storing and forwarding by messages, the computing processes running on Q nodes that store copies of a streamlet can also store and forward messages by blocks of messages, as described earlier in reference to FIG. 4C. For instance, the computing process storing the copy #1 of the streamlet 4102 on Q node 208 can allocate memory and store a block of, for example, 200 kilobytes of messages (although other sizes of blocks of messages are possible), and forward the block of messages to the next adjacent copy (copy #2) of the chain for storage, and so on, until the block messages is stored in the tail copy (copy #4) on the Q node 506.

Figure 5B:
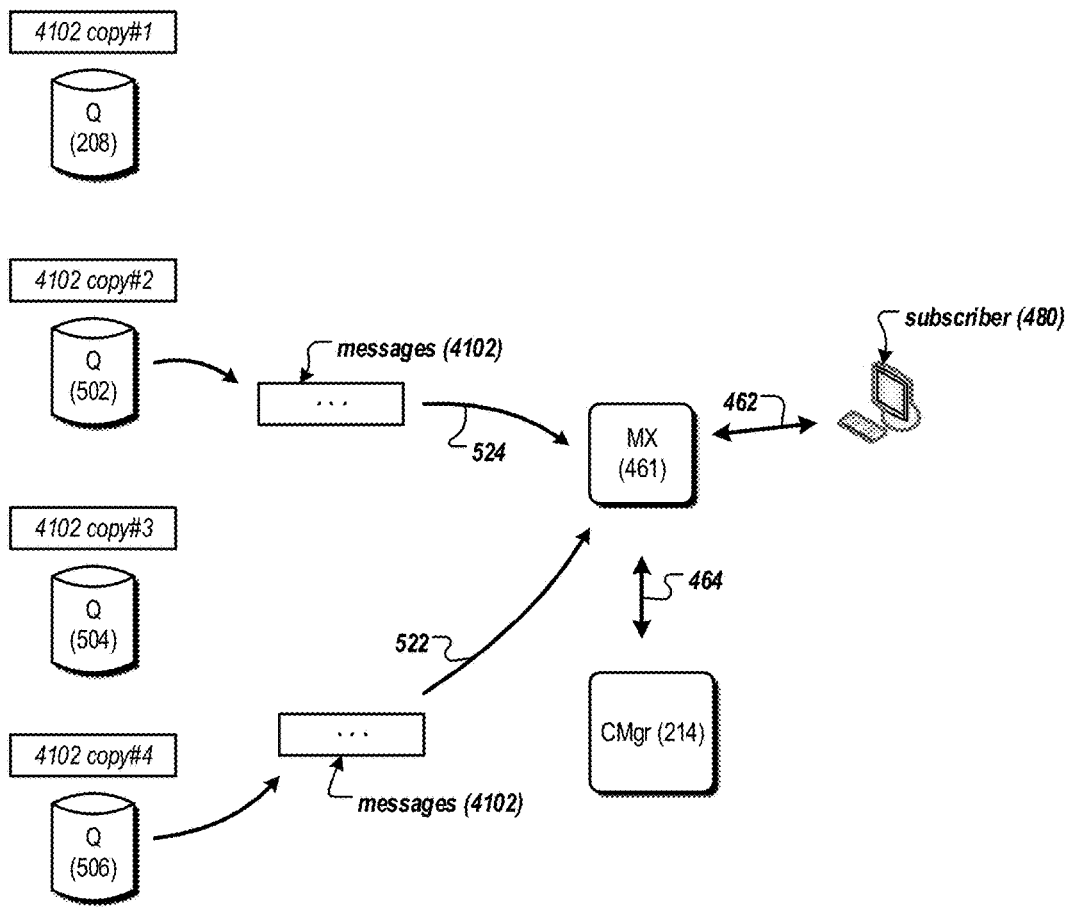
FIG. 5B is a data flow diagram of an example method for retrieving stored messages in a messaging system.

Messages of the streamlet 4102 can be retrieved and delivered to a subscriber of the channel foo from one of the copies of the streamlet 4102. FIG. 5B is a data flow diagram of an example method 550 for retrieving stored messages in the messaging system 100. For instance, the subscriber 480 can send a request for subscribing to messages of the channel to the MX node 461, as described earlier in reference to FIG. 4B. The configuration manager 214 can provide to the MX node 461 a read grant for one of the copies of the streamlet 4102. The MX node 461 can retrieve messages of the streamlet 4102 from one of the Q nodes storing a copy of the streamlet 4102, and provide the retrieved messages to the subscriber 480. For instance, the MX node 461 can retrieve messages from the copy #4 (the tail copy) stored on the Q node 506 (522). As for another example, the MX node 461 can retrieve messages from the copy #2 stored on the Q node 502 (524). In this way, the multiple copies of a streamlet (e.g., copies #1, #2, #3, and #4 of the streamlet 4102) provide replication and redundancy against failure if only one copy of the streamlet were stored in the messaging system 100. In various implementations, the configuration manager 214 can balance workloads among the Q nodes storing copies of the streamlet 4102 by directing the MX node 461 (e.g., with a read grant) to a particular Q node that has, for example, less current read and write grants as compared to other Q nodes storing copies of the streamlet 4102.

A Q node storing a particular copy in a chain of copies of a streamlet may fail, e.g., a computing process on the Q node storing the particular copy may freeze. Other failure modes of a Q node are possible. An MX node can detect a failed node (e.g., from non-responsiveness of the failed node) and report the failed node to a configuration manager in the messaging system 100 (e.g., configuration manager 214). A peer Q node can also detect a failed Q node and report the failed node to the configuration manager. For instance, an upstream Q node may detect a failed downstream Q node when the downstream Q node is non-responsive, e.g., fails to acknowledge a message storage request from the upstream Q node as described earlier. It is noted that failure of a Q node storing a copy of a particular streamlet of a particular channel stream does not have to be for publish or subscribe operations of the particular streamlet or of the particular channel stream. Failure stemming from operations on another streamlet or another channel stream can also alert a configuration manager about failure of a Q node in the messaging system 100.

Figure 5C:
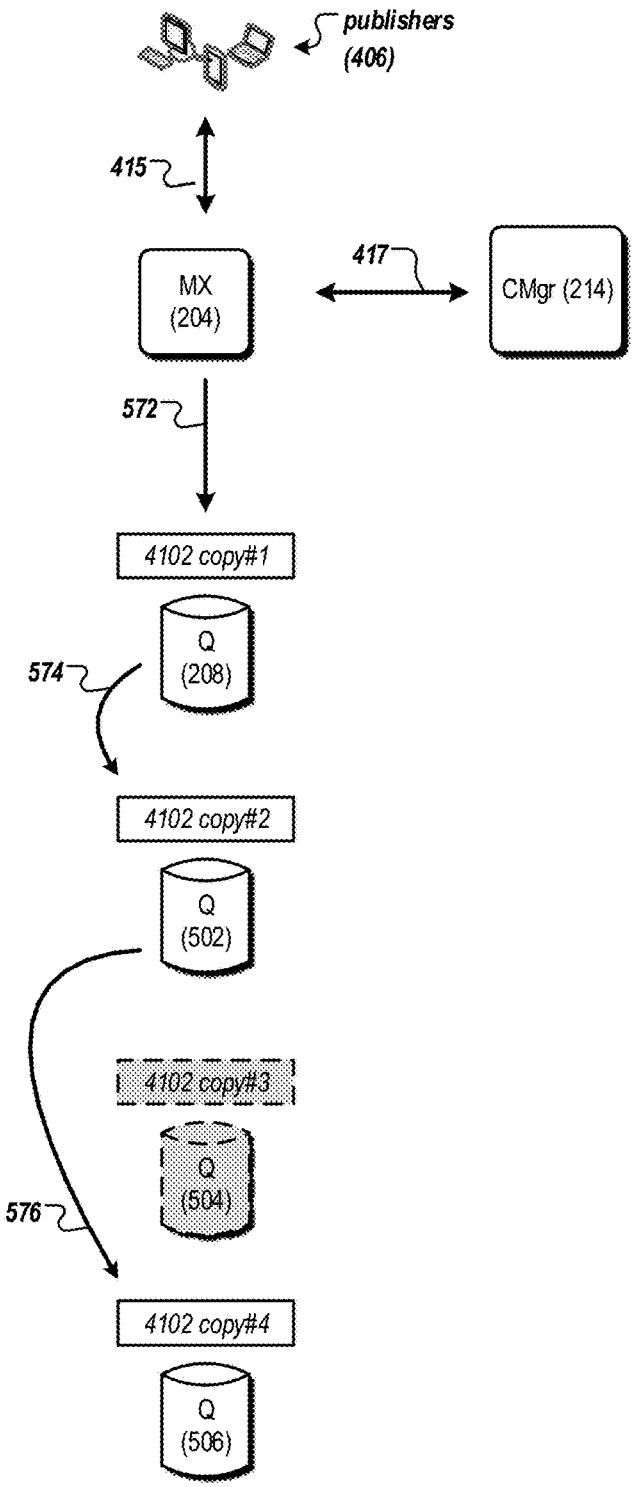
FIGS. 5C and 5D are data flow diagrams of example methods for repairing a chain of copies of data in a messaging system.
Figure 5D:
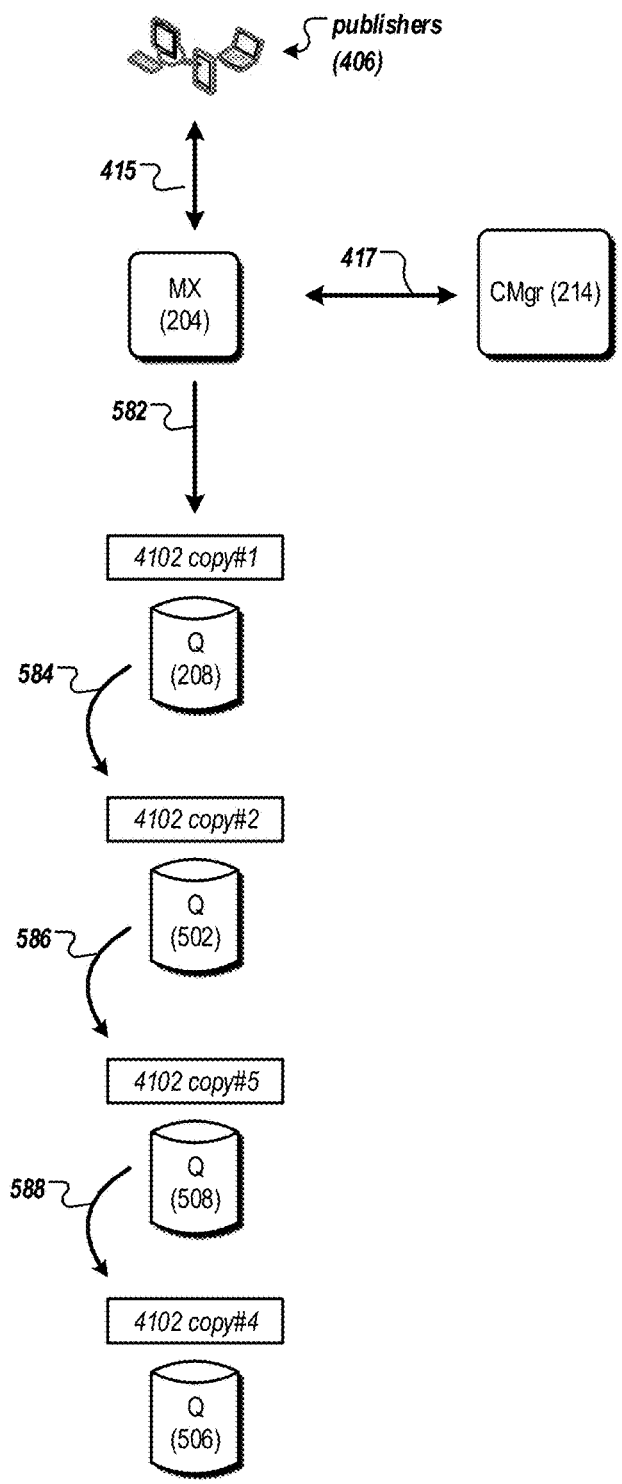

When a Q node storing a particular copy in a chain of copies of a streamlet fails, a configuration manager in the messaging system 100 can repair the chain by removing the failed node, or by inserting a new node for a new copy into the chain, for example. FIGS. 5C and 5D are data flow diagrams of example methods for repairing a chain of copies of a streamlet in the messaging system 100. In FIG. 5C, for instance, after detecting that the Q node 504 fails, the configuration manager 214 can repair the chain of copies by redirecting messages intended to be stored in the copy #3 of the streamlet 4102 on the Q node 502 to the copy #4 of the streamlet 4102 on the Q node 506. In this example, a message (or a block of messages) is first sent from the MX node 204 to the Q node 208 for storage in the copy #1 of the streamlet 4102 (572). The message then is forwarded to the Q node 502 for storage in the copy #2 of the streamlet 4102 (574). The message is then forwarded to the Q node 506 for storage in the copy #4 of the streamlet 4102 (576). The Q node 506 can send an acknowledgement message to the configuration manager 214 indicating that the message has been stored successfully.

Here, a failed node can also be the node storing the head copy or the tail copy of the chain of copies. For instance, if the Q node 208 fails, the configuration manager 214 can instruct the MX node 204 first to send the message to the Q node 502 for storage in the copy #2 of the streamlet 4102. The message is then forwarded to the next adjacent copy in the chain for storage, until the message is stored in the tail copy.

If the Q node 506 fails, the configuration manager 214 can repair the chain of copies of the streamlet 4102 such that the copy #3 on the Q node 504 becomes the tail copy of the chain. A message is first stored in the copy #1 on the Q node 208, then subsequently stored in the copy #2 on the Q node 502, and the copy #3 on the Q node 504. The Q node 504 then can send an acknowledgement message to the configuration manager 214 indicating that the message has been stored successfully.

In FIG. 5D, the configuration manager 214 replaces the failed node Q node 504 by allocating a new Q node 508 to store a copy #5 of the chain of copies of the streamlet 4102. In this example, the configuration manager 214 instructs the MX node 204 to send a message (from the publishers 406) to the Q node 208 for storage in the copy #1 of the streamlet 4102 (582). The message is then forwarded to the Q node 502 for storage in the copy #2 of the streamlet 4102 (584). The message is then forwarded to the Q node 508 for storage in the copy #5 of the streamlet 4012 (586). The message is then forwarded to the Q node 506 for storage in the copy #4 of the streamlet 4102 (588). The Q node 506 can send an acknowledgement message to the configuration manager 214 indicating that the message has been stored successfully.

Figure 6:
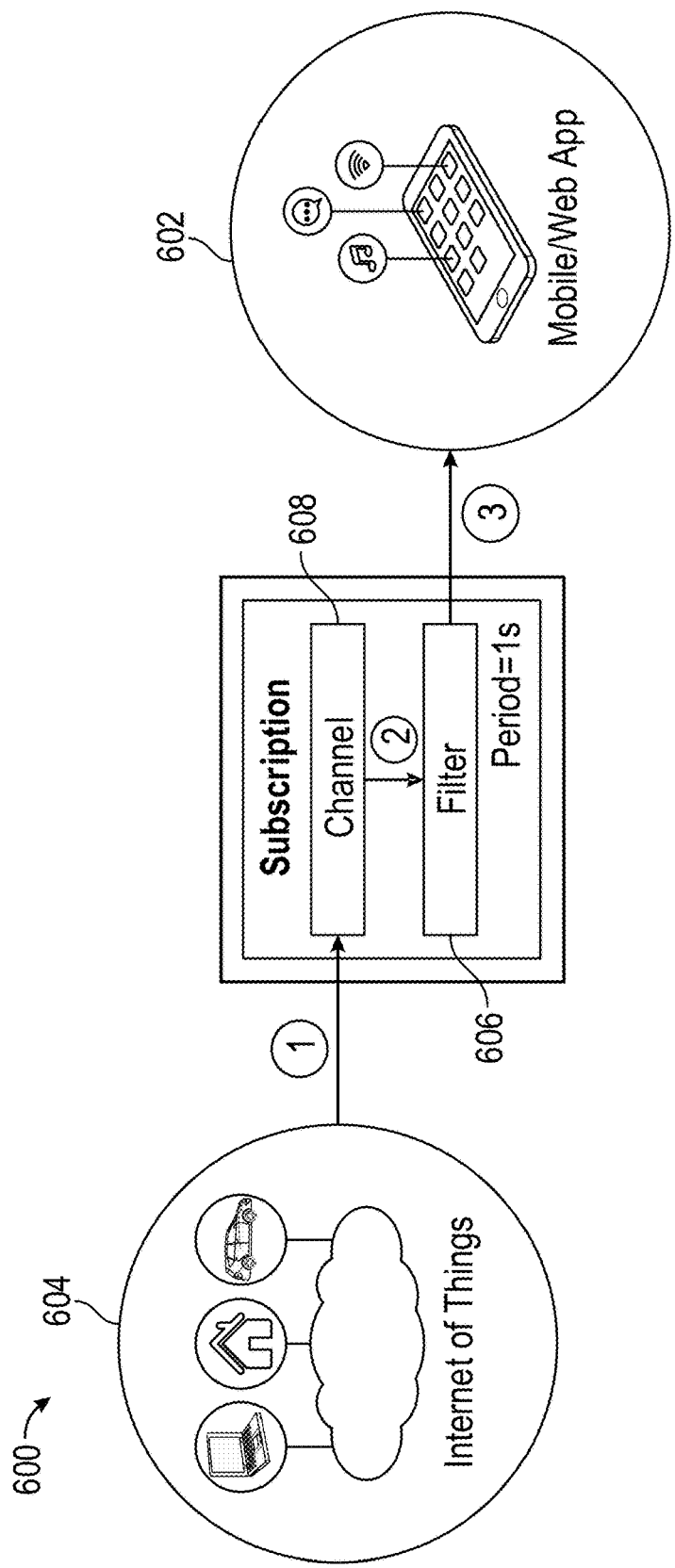
FIG. 6 is an example data flow diagram for the application of filtering criteria in a messaging system.

FIG. 6 is a data flow diagram 600 illustrating the application of selective filtering, searching, transforming, querying, aggregating and transforming of messages in real time to manage the delivery of messages into and through each channel and on to individual subscribers. Users operating applications on client devices, such as, for example, smart-phones, tablets, and other internet-connected devices, act as subscribers (e.g., subscriber 480 in FIG. 4B, subscriber 602 in FIG. 6). The applications may be, for example, consumers of the messages to provide real-time information about news, transportation, sports, weather, or other subjects that rely on published messages attributed to one or more subjects and/or channels. Message publishers 604 can be any internet-connected service that provides, for example, status data, transactional data or other information that is made available to the subscribers 602 on a subscription basis. In some versions, the relationship between publishers and channels is 1:1, that is there is one and only one publisher that provides messages into that particular channel. In other instances, the relationship may be many-to-one (more than one publisher provides messages into a channel), one-to-many (a publisher's messages are sent to more than one channel), or many-to-many (more than one publisher provides messages to more than one channel). Typically, when a subscriber subscribes to a channel, they receive all messages and all message data published to the channel as soon as it is published. The result, however, is that many subscribers can receive more data (or data that requires further processing) than is useful. The additional filtering or application of functions against the data places undue processing requirements on the subscriber application and can delay presentation of the data in its preferred format.

A filter 606 can be created by providing suitable query instructions at, for example, the time the subscriber 602 subscribes to the channel 608. The filter 606 that is specified can be applied to all messages published to the channel 608 (e.g., one message at a time), and can be evaluated before the subscriber 602 receives the messages (e.g., see Step 2 in FIG. 6). By allowing subscribers 602 to create query instructions a priori, that is upon subscribing to the channel 608 and before data is received into the channel 608, the burden of filtering and processing messages moves closer to the data source, and can be managed at the channel level. As a result, the messages are pre-filtered and/or pre-processed before they are forwarded to the subscriber 602. Again, the query instructions need not be based on any a priori knowledge of the form or substance of the incoming messages. The query instructions can be used to pre-process data for applications such as, for example, real-time monitoring services (for transportation, healthcare, news, sports, weather, etc.) and dashboards (e.g., industrial monitoring applications, financial markets, etc.) to filter data, summarize data and/or detect anomalies. One or more filters 606 can be applied to each channel 608.

The query instructions can implement real-time searches and queries, aggregate or summarize data, or transform data for use by a subscriber application. In some embodiments, including those implementing JSON formatted messages, the messages can be generated, parsed and interpreted using the query instructions, and the lack of a pre-defined schema (unlike conventional RDBMS/SQL-based applications) means that the query instructions can adapt to changing business needs without the need for schema or application layer changes. This allows the query instructions to be applied selectively at the message level within a channel, thus filtering and/or aggregating messages within the channel. In some instances, the queries may be applied at the publisher level—meaning channels that receive messages from more than one publisher may apply certain filters against messages from specific publishers. The query instructions may be applied on a going-forward basis, that is on only newly arriving messages, and/or in some cases, the query instructions may be applied to historical messages already residing in the channel queue.

The query instructions can be applied at either or both of the ingress and egress side of the PubSub service. On the egress side, the query instructions act as a per-connection filter against the message channels, and allows each subscriber to manage their own set of unique filters. On the ingress side, the query instructions operate as a centralized, system-wide filter that is applied to all published messages.

For purposes of illustration and not limitation, examples of query instructions that may be applied during message ingress include:

A message may be distributed to multiple channels or to a different channel (e.g., based on geo-location in the message, or based on a hash function of some value in the message).

A message may be dropped due to spam filtering or DoS rules (e.g., limiting the number of messages a publisher can send in a given time period).

An alert message may be sent to an admin channel on some event arriving at any channel (e.g., cpu_temp>threshold).

For purposes of illustration and not limitation, examples of query instructions that may be applied during message egress include:

Channels that contain events from various sensors where the user is only interested in a subset of the data sources.

Simple aggregations, where a system reports real time events, such as cpu usage, sensor temperatures, etc., and we would like to receive some form of aggregation over a short time period, irrespective of the number of devices reporting or the reporting frequency, e.g., average(cpu_load), max(temperature), count(number_of_users), count(number_of_messages) group by country.

Transforms, where a system reports real time events and metadata is added to them from mostly static external tables, e.g., adding a city name based on IP address, converting an advertisement ID to a marketing campaign ID or to a marketing partner ID.

Adding default values to event streams where such values do not exist on certain devices.

Advanced aggregations, where a system reports real time events, and combines some mostly static external tables data into the aggregation in real time, e.g., grouping advertisement clicks by partners and counting number of events.

Counting number of user events, grouping by a/b test cell allocation.

In some embodiments, the query instructions may be used to define an index or other suitable temporary data structure, which may then be applied against the messages as they are received into the channel to allow for the reuse of the data element(s) as searchable elements. In such cases, a query frequency may be maintained to describe the number of times (general, or in a given period) that a particular data element is referred to or how that element is used. If the frequency that the data element is used in a query exceeds some threshold, the index may be stored for subsequent use on incoming messages, whereas in other instances in which the index is used only once (or infrequently) it may be discarded. In some instances, the query instruction may be applied to messages having arrived at the channel prior to the creation of the index. Thus, the messages are not indexed according to the data elements described in the query instructions but processed using the query instructions regardless, whereas messages arriving after the creation of the index may be filtered and processed using the index. For queries or other subscriptions that span the time at which the index may have been created, the results of applying the query instructions to the messages as they are received and processed with the index may be combined with results of applying the query instructions to non-indexed messages received prior to receipt of the query instructions.

For purposes of illustration and not limitation, one use case for such a filtering application is a mapping application that subscribes to public transportation data feeds, such as the locations of all buses across a city. The published messages may include, for example, geographic data describing the location, status, bus agency, ID number, route number, and route name of the buses. Absent pre-defined query instructions, the client application would receive individual messages for all buses. However, query instructions may be provided that filter out, for example, inactive routes and buses and aggregate, for example, a count of buses by agency. The subscriber application receives the filtered bus data in real time and can create reports, charts and other user-defined presentations of the data. When new data is published to the channel, the reports can be updated in real time based on a period parameter (described in more detail below).

The query instructions can be provided (e.g., at the time the subscriber subscribes to the channel) in any suitable format or syntax. For example, the following illustrates the structure of several fields of a sample subscription request Protocol Data Unit (PDU) with the PDU keys specific to adding a filter to a subscription request:

```
{
    "action": "subscribe",
    "body": {
        "channel": "ChannelName"
        "filter": "QueryInstructions"
        "period": [1-60, OPTIONAL]
    }
}
```

In the above subscription request PDU, the "channel" field can be a value (e.g., string or other appropriate value or designation) for the name of the channel to which the subscriber wants to subscribe. The "filter" field can provide the query instructions or other suitable filter commands, statements, or syntax that define the type of key/values in the channel message to return to the subscriber. The "period" parameter specifies the time period in, for example, seconds, to retain messages before returning them to the subscriber (e.g., an integer value from 1 to 60, with a default of, for example, 1). The "period" parameter will be discussed in more detail below. It is noted that a subscription request PDU can include any other suitable fields, parameters, or values.

One example of a query instruction is a "select" filter, which selects the most recent (or "top") value for all (e.g., "select.*") or selected (e.g., "select.name") data elements. In the example below, the Filter column shows the filter value sent in the query instructions as part of a subscription as the filter field. The Message Data column lists the input of the channel message data and the message data sent to the client as output. In this example, the value for the "extra" key does not appear in the output, as the "select" filter can return only the first level of results and does not return any nested key values.

| Filter | Message Data |
| --- | --- |
| SELECT * | Input<br>{"name": "art", "eye": "blue"},<br>{"name": "art", "age": 11},<br>{"age": 12, "height": 190}<br>Output<br>{"name": "art", "age": 12, "eye": "blue", "height": 190} |
| SELECT top.* | Input<br>{"top": {"age": 12, "eyes": "blue"}},<br>{"top": {"name": "joy", "height": 168}, "extra": 1},<br>{"top": {"name": "art"}}<br>Output<br>{"name": "art", "age": 12, "eye": "blue", "height": 168} |

For aggregative functions, all messages can be combined that satisfy the query instructions included in the GROUP BY clause. The aggregated values can then be published as a single message to the subscriber(s) at the end of the aggregation period. The number of messages that are aggregated depends on, for example, the number of messages received in the channel in the period value for the filter. For instance, if the period parameter is set to 1, and 100 messages are received in one second, all 100 messages are aggregated into a single message for transmission to the subscsriber(s). As an example, a query instruction as shown below includes a filter to aggregate position data for an object, grouping it by obj_id, with a period of 1:

SELECT*WHERE (<expression with aggregate function>) GROUP BY obj_id

In this example, all messages published in the previous second with the same obj_id are grouped and sent as a batch to the subscriber(s).

In some embodiments, a MERGE(*) function can be used to change how aggregated message data is merged. The MERGE(*) function can return a recursive union of incoming messages over a period of time. The merge function may be used, for example, to track location data for an object, and the subscriber is interested in the most recent values for all key/value pairs contained in a set of aggregated messages. The following statement shows an exemplary syntax for the MERGE(*) function:

SELECT [expr] [name,]MERGE(*)[.*] [AS name] [FROM expr] [WHERE expr] [HAVING expr] GROUP BY name The following examples illustrate how the MERGE(*) function may be applied within query instructions to various types of channel messages. In the following examples, the Filter column shows the filter value included in the query instructions as part of a subscription request as the FILTER field. The Message Data column lists the Input channel message data and the resulting message data sent to the subscriber as Output. The filter returns the most recent values of the keys identified in the input messages, with the string MERGE identified as the column name in the output message data. The first example below shows the MERGE (*) function in a filter with a wildcard, for the message data is returned using the keys from the input as column names in the output.

| Filter | Message Data |
| --- | --- |
| SELECT MERGE(*) | Input<br>{"name": "art", "age": 10},<br>{"name": "art", "age": 11, "items": [0]}<br>Output<br>{"MERGE": {"name": "art", "age": 11, "items": [0]}} |

The next example illustrates the use of the MERGE(*) function in a filter using a wildcard and the "AS" statement with a value of MERGE. The output data includes MERGE as the column name.

| Filter | Message Data |
|---|---|
| SELECT MERGE(*).* | Input<br>{<br>  "name": "art",<br>  "age": 12,<br>  "items": [0],<br>  "skills": {<br>    "work": ["robots"]<br>  }<br>},<br>{<br>  "name": "art",<br>  "age": 13,<br>  "items": ["car"],<br>  "skills": {<br>    "home": ["cooking"]<br>  }<br>} |

-continued

| Filter | Message Data |
|---|---|
| | Output<br>{<br>  "name": "art",<br>  "age": 13,<br>  "items": ["car"],<br>  "skills": {<br>    "work": ["robots"],<br>    "home": ["cooking"]<br>  }<br>} |
| SELECT MERGE(top.*) AS merge | Input<br>{"top": { }, "garbage": 0},<br>{"top": {"name": "art", "eyes": "blue"}},<br>{"top": {"name": "joy", "height": 170}}<br>Output<br>{"merge": {"name": "joy", "eyes": "blue", "height": 170}} |

Generally, for aggregative functions and for filters that only include a SELECT(expr) statement, only the latest value for any JSON key in the message data from the last message received can be stored and returned. Therefore, if the most recent message received that satisfies the filter statement is missing a key value identified in a previously processed message, that value is not included in the aggregate, which could result in data loss. However, filters that also include the MERGE(*) function can retain the most recent value for all keys that appear in messages to an unlimited JSON object depth. Accordingly, the most recent version of all key values can be retained in the aggregate.

The MERGE(*) function can be used to ensure that associated values for all keys that appear in any message during the aggregation period also appear in the final aggregated message. For example, a channel may track the physical location of an object in three dimensions: x, y, and z. During an aggregation period of one second, two messages are published to the channel, one having only two parameters: OBJ{x:1, y:2, z:3} and OBJ{x:2, y:3}. In the second message, the z value did not change and was not included in the second message. Without the MERGE(*) function, the output result would be OBJ{x:2, y:3}. Because the z value was not present in the last message in the aggregation period, the z value was not included in the final aggregate. However, with the MERGE(*) function, the result is OBJ{x:2, y:3, z:3}.

The following table shows one set of rules that may be used to aggregate data in messages, depending on the type of data. For arrays, elements need not be merged, but instead JSON values can be overwritten for the array in the aggregate with the last array value received.

| Type of JSON Data | Data to Aggregate {msg1}, {msg2} | Without MERGE(*) | With MERGE(*) |
|---|---|---|---|
| Additional key/value | {a: 1, b: 2}, {c: 3} | {c: 3} | {a: 1, b: 2, c: 3} |
| Different value datatype | {a: 2}, {a: "2"} | {a: "2"} | {a: "2"} |
| Missing key/value | {a: 2}, { } | {a: 2} | {a: 2} |
| null value | {a: 2}, {a: null} | {a: null} | {a: null} |
| Different key value | {a: {b: 1}}, {a: {c: 2}} | {a: {c: 2}} | {a: {b: 1, c: 2}} |
| Arrays | {a: [1, 2]}, {a: [3, 4]} | {a: [3, 4]} | {a: [3, 4]} |

The query instructions can be comprised of one or more suitable filter commands, statements, functions, or syntax. For purposes of illustration and not limitation, in addition to the SELECT and MERGE functions, the query instructions can include filter statements or functions, such as, for example, ABS(expr), AVG(expr), COALESCE(a[, b ... ]), CONCAT(a[, b ... ]), COUNT(expr), COUNT_DISTINCT (expr), IFNULL(expr1, expr2), JSON(expr), MIN(expr[, expr1, ... ]), MAX(expr[, expr1, ... ]), SUBSTR(expr, expr1[, expr2]), SUM(expr), MD5(expr), SHA1(expr), FIRST_VALUE(expr) OVER (ORDER BY expr1), and/or LAST VALUE(expr) OVER (ORDER BY expr1), where "expr" can be any suitable expression that is capable of being processed by a filter statement or function, such as, for example, a SQL or SQL-like expression. Other suitable filter commands, statements, functions, or syntax are possible for the query instructions.

According to the present invention, non-filtered queries can translate to an immediate copy of the message to the subscriber, without any JSON or other like processing. Queries that include a SELECT filter command (without aggregation) can translate into an immediate filter. In instances in which the messages are formatted using JSON, each message may be individually parsed and any WHERE clause may be executed directly on the individual message as it arrives, without the need for creating indices or other temporary data structures. If the messages pass the WHERE clause filter, the SELECT clause results in a filtered message that can be converted back to its original format or structure (e.g., JSON) and sent to the subscriber.

Aggregative functions, such as, for example, COUNT( ), SUM( ), AVG( ), and the like, can translate into an immediate aggregator. In instances in which the messages are formatted using JSON, each message may be individually parsed and any WHERE clause may be executed directly on the individual message as it arrives, without the need for creating indices or other temporary data structures. If a WHERE clause is evaluated, messages passing such criteria are aggregated (e.g., aggregates in the SELECT clause are executed, thereby accumulating COUNT, SUM, AVG, and so forth) using the previous accumulated value and the value from the individual message. Once per aggregation period (e.g., every 1 second), the aggregates are computed (e.g., AVG=SUM/COUNT), and the SELECT clause outputs the aggregated message, which can be converted to its original format or structure (e.g., JSON) and sent to the subscriber.

More complex aggregative functions, such as, for example, GROUP BY, JOIN, HAVING, and the like, can be translated into a hash table aggregator. Unlike SELECT or other like functions that can use a constant memory, linearly expanding memory requirements can be dependent upon the results of the GROUP BY clause. At most, grouping by a unique value (e.g., SSN, etc.) can result in a group for each individual message, but in most cases grouping by a common data element (e.g., user_id or other repeating value) can result in far fewer groups. In practice, each message is parsed (from its JSON format, for example). The WHERE clause can be executed directly on the individual message as it arrives, without creating indices or other temporary structures. If the WHERE clause is satisfied, the GROUP BY expressions can be computed directly and used to build a hash key for the group. The aggregative functions in the SELECT clause can be executed, accumulating COUNT, SUM, AVG, or other functions using the previous accumulated value specific for the hash key (group) and the value from the individual message. Once per aggregation period (e.g., every 1 second), the aggregates are computed (e.g., AVG=SUM/COUNT) for each hash key (group), and the SELECT clause can output the aggregated message for each hash key to be converted back to its original format or structure (e.g., JSON) and sent to the subscriber (e.g., one message per hash key (group)).

In embodiments in which the aggregation period is limited (e.g., 1 second-60 seconds) and the network card or other hardware/throughput speeds may be limited (e.g., 10/gbps), the overall maximal memory consumption can be calculated as time*speed (e.g., 1 GB per second, or 60 GB per minute). Hence, the upper bound is independent of the number of subscribers. In certain implementations, each message only need be parsed once (e.g., if multiple filters are set by multiple clients) and only if needed based on the query instructions, as an empty filter does not require parsing the message.

Figure 7A:
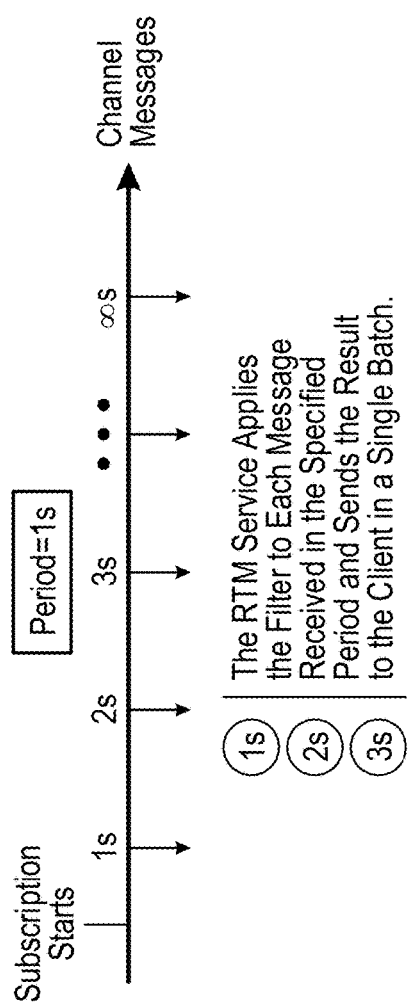
FIGS. 7A-7D are illustrations of how messages may be processed using query instructions that include a period-based parameter.

Referring to FIG. 7A, subscriptions can include a "period" parameter, generally defined in, for example, seconds and in some embodiments can range from 1 to 60 seconds, although other time increments and time ranges are possible. The period parameter(s) can be purely sequential (e.g., ordinal) and/or time-based (e.g., temporal) and included in the self-described data and therefore available for querying, aggregation, and the like. For example, FIG. 7A illustrates the filter process according to the present invention for the first three seconds with a period of 1 second. In the present example, the subscription starts at t=0. The filter created from the query instructions is applied against all messages received during each 1-second period (e.g., one message at a time). The results for each period are then batched and forwarded to the subscriber. Depending on the query instructions used, the messages can be aggregated using the aggregation functions discussed previously before the message data is sent to the subscriber.

In some cases, the process defaults to sending only new, incoming messages that meet the query instructions on to the subscriber. However, a subscriber can subscribe with history and use a filter, such that the first message or messages sent to the subscriber can be the historical messages with the filter applied. Using the period of max_age and/or a "next" parameter provides additional functionality that allows for retrieval and filtering of historical messages.

Figure 7B:
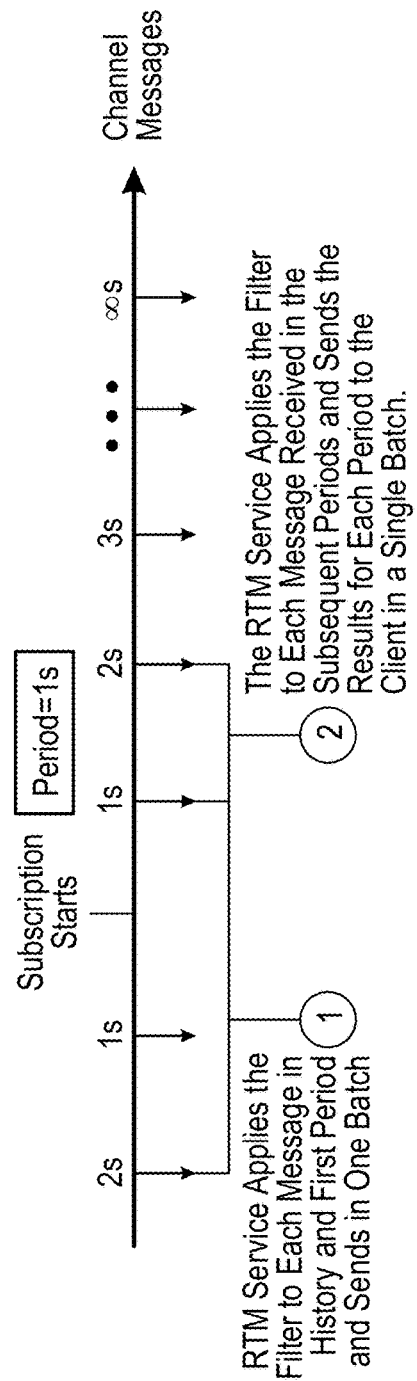

More particularly, a max_age parameter included with the query instructions can facilitate the retrieval of historical messages that meet this parameter. FIG. 7B illustrates an example of a max_age parameter of 2 seconds (with a period of 1 second) that is provided with the query instructions. The filter created from the query instructions is applied to the historical messages from the channel that arrived from t−2 through t=0 (t=0 being the time the subscription starts), and to the messages that arrived in the first period (from t=0 to t+1). These messages can be sent in a single batch to the subscriber (as Group 1). The filter is applied to each message in each subsequent period (e.g., from t+1 to t+2 as Group 2) to batch all messages that meet the query instructions within that period. Each batch is then forwarded on to the subscriber.

Figure 7C:
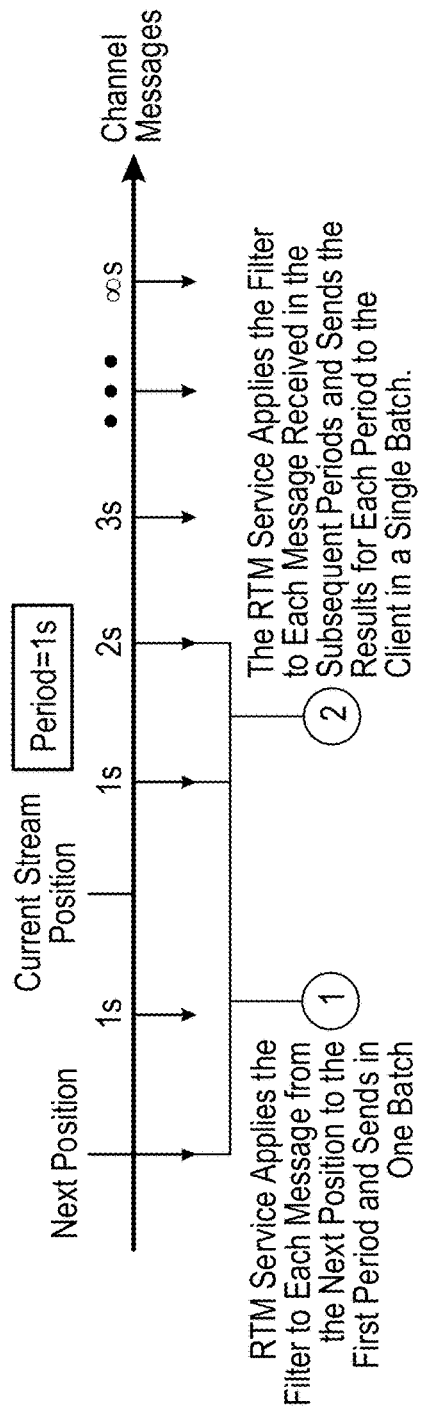

When a subscriber subscribes with a "next" parameter to a channel with a filter, the filter can be applied to all messages from the next value up to the current message stream position for the channel, and the results can be sent to the subscriber in, for example, a single batch. For example, as illustrated in FIG. 7C, a next parameter is included with the query instructions (with a period of 1 second). The next parameter instructs the process to apply the filter created from the query instructions to each message from the "next position" up through the current stream position (e.g., up to t=0) and to the messages that arrived in the first period (from t=0 to t+1). These messages can be sent in a single batch to the subscriber (as Group 1). The filter is applied to each message in each subsequent period (e.g., from t+1 to t+2 as Group 2) to batch all messages that meet the query instructions within that period. Each batch is then forwarded on the subscriber.

Figure 7D:
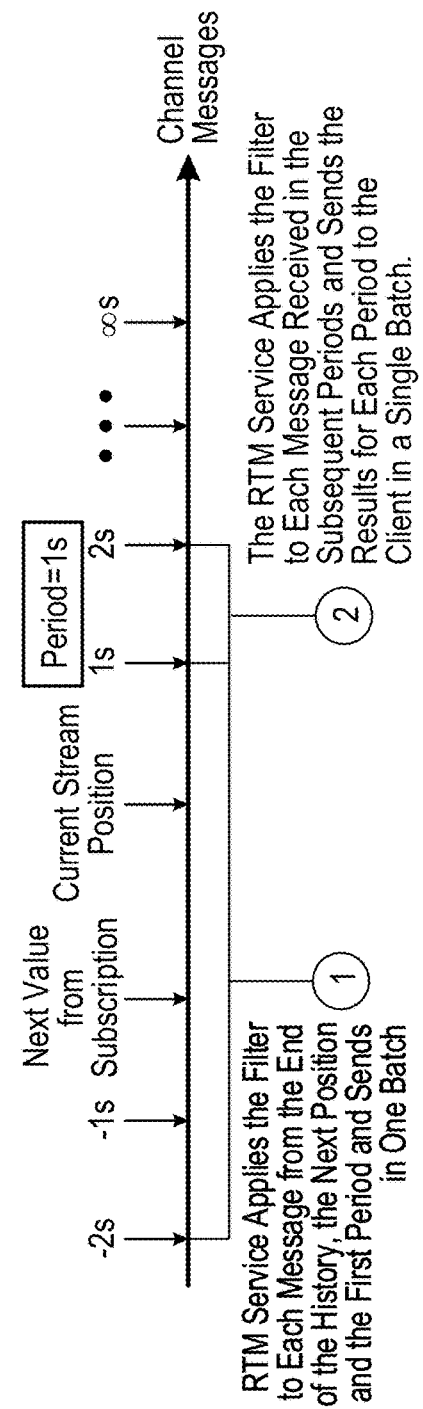

When a subscriber subscribes with a next parameter, chooses to receive historical messages on a channel, and includes a filter in the subscription, the subscriber can be updated to the current message stream position in multiple batches. FIG. 7D illustrates an example of a max_age parameter of 2 seconds (with a period of 1 second) and a next parameter that can be combined into one set of query instructions. The filter created from the query instructions is applied to the historical messages from the channel that arrived from the end of the history to the "next" value of the subscription (i.e., from 2 seconds before the next value up to the next value), to the messages from the next value to the current stream position (e.g., up to t=0), and to the messages that arrived in the first period (from t=0 to t+1). These messages can be sent in a single batch to the subscriber (as Group 1). The filter is applied to each message in each subsequent period (e.g., from t+1 to t+2 as Group 2) to batch all messages that meet the query instructions within that period. Each batch is then forwarded on the subscriber. Consequently, historical messages can be combined with messages that start at a particular period indicator and batched for transmission to the subscriber.

The query instructions can define how one or more filters can be applied to the incoming messages in any suitable manner. For example, the resulting filter(s) can be applied to any or all messages arriving in each period, to any or all messages arriving across multiple periods, to any or all messages arriving in select periods, or to any or all messages arriving on a continuous or substantially continuous basis (i.e., without the use of a period parameter such that messages are not retained before returning them to the subscriber). Such filtered messages can be batched in any suitable manner or sent individually (e.g., one message at a time) to subscribers. In particular, the filtered messages can be sent to the subscriber in any suitable format or syntax. For example, the following illustrates the structure of several fields of a sample channel PDU that contains the message results from a filter request:

```
{
    "action": "channel/data",
    "body": {
        "channel": ChannelName
        "next": ChannelStreamPosition
        "messages": [ChannelData]+   // Can be one or more messages
    }
}
```

In the above channel PDU, the "channel" field can be a value (e.g., string or other appropriate value or designation) of the channel name to which the subscriber has subscribed. The "next" field can provide the channel stream position of the batch of messages returned in the channel PDU. The "messages" field provides the channel data of the messages resulting from application of the specified filter. One or more messages can be returned in the "messages" field in such a channel PDU. It is noted that a channel PDU can include any other suitable fields, parameters, values, or data.

Figure 8:
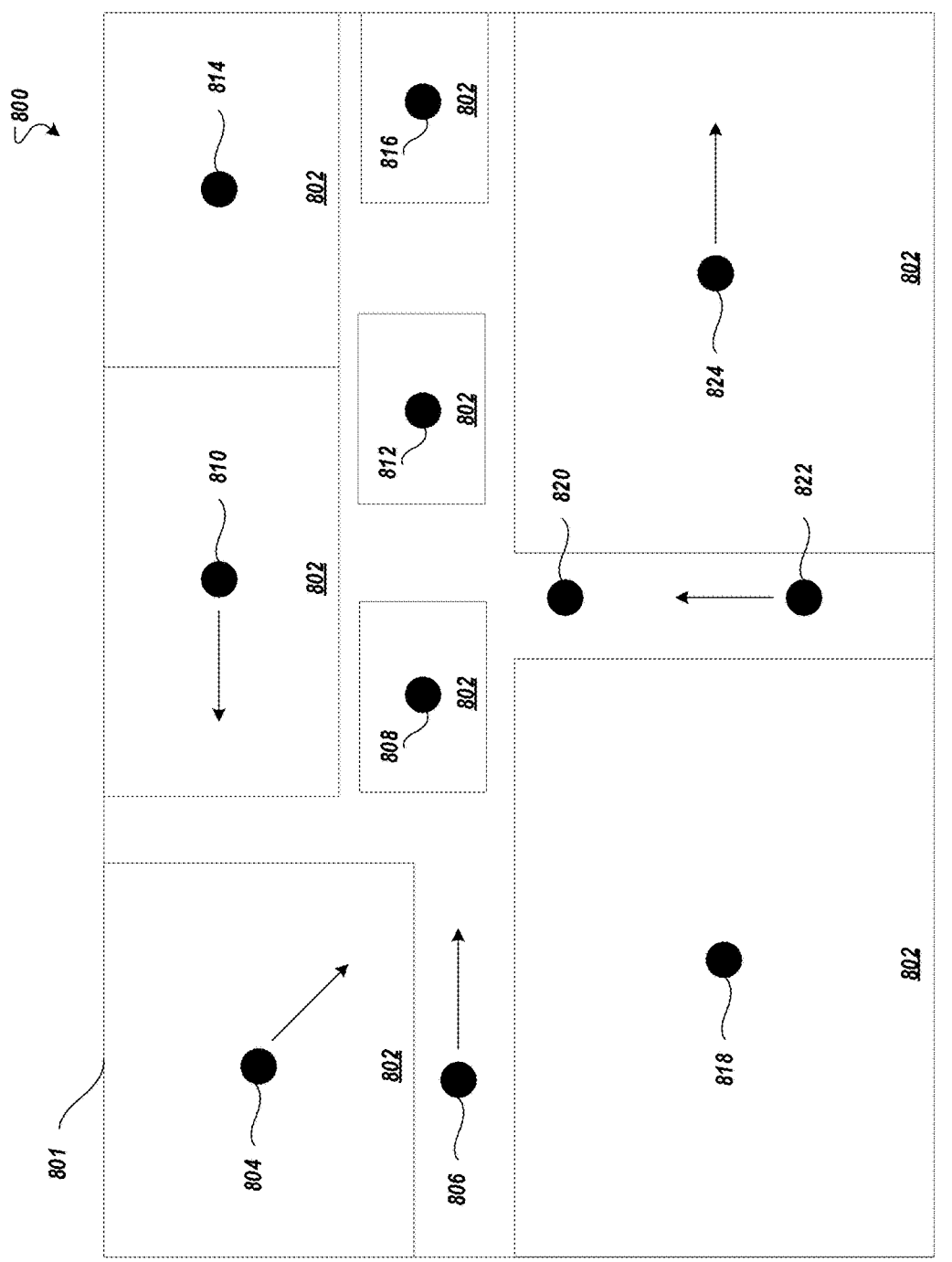
FIG. 8 is a diagram illustrating an example map of an environment in which one or more electronic devices may be determined and tracked.

Turning now to FIG. 8, an example diagram of a map 800 (e.g., radio map) is illustrated. As depicted, the map 800 may include a map of an environment 801. The environment 801 may include, for example, an indoor environment (e.g., inside of residential, commercial, or industrial buildings), an outdoor environment (e.g., a public or private campus, a neighborhood, a town, a city, a country, a geographical region, and so forth), or a combination of an indoor and outdoor environments (e.g., a building and adjacent parking and recreational areas). As illustrated, the map 800 may include a number of locations 802 (e.g., rooms within a building, or specific areas or regions of a campus) by which a number nodes 804, 806, 808, 810, 812, 814, 816, 818, 820, 822, and 824 may either be located or move within and about. In certain embodiments, each of the nodes 804, 806, 808, 810, 812, 814, 816, 818, 820, 822, and 824 may represent any of various client electronic devices (e.g., mobile electronic devices [e.g., mobile phones, tablet computers, laptop computers, cameras], in-home electronic devices [e.g., video game consoles, smoke detectors, thermostats, gateway devices, desktop computers, projectors], wearable electronic devices [e.g., smartwatches, wristbands, pedometers, electronic eyewear, electronic headwear], and so forth) that may be associated with users stationary or moving within or about the environment 801.

In one embodiment, each of the nodes 804, 806, 808, 810, 812, 814, 816, 818, 820, 822, and 824 may be connected to a wireless local area network (WLAN) (e.g., Wi-Fi™, UWB, White-Fi, and so forth), a cellular network (e.g., 4G, LTE™, 5G, LTE-LAA™, LTE-U™, and so forth), personal area network (PAN) (e.g., 6LowWPAN™, RuBee™, Z-Wave, ZigBee™ WANET, and so forth), or other similar wireless network within or about the environment 801. As will be further appreciated with respect to FIG. 9, the nodes 804, 806, 808, 810, 812, 814, 816, 818, 820, 822, and 824 may each be in communication with one or more server electronic devices to send and receive messages regarding an approximate geolocation of the nodes 804, 806, 808, 810, 812, 814, 816, 818, 820, 822, and 824 with respect to the environment 801.

In certain embodiments, as further illustrated by FIG. 8, some of the nodes 808, 812, 814, 816, 818, and 820 may include adjacent arrow illustrations while others may not. Specifically, in accordance with the present embodiments, the nodes 808, 812, 814, 816, 818, and 820 (e.g., those including no adjacent arrow illustrations) may be stationary within or between pathways of the environment 801. Similarly, nodes 804, 806, 810, 822, and 824 (e.g., those including the adjacent arrow illustrations) may be moving within or between pathways of the environment 801. It should be appreciated that each of the nodes 804, 806, 808, 810, 812, 814, 816, 818, 820, 822, and 824 may, at different times, for example, be stationary or mobile within or about the environment 801. In accordance with the present embodiments, a server electronic device in communication with the nodes 804, 806, 808, 810, 812, 814, 816, 818, 820, 822, and 824 may determine and track the geolocation of the nodes 804, 806, 808, 810, 812, 814, 816, 818, 820, 822, and 824 within or about the environment 801.

For example, as will be further appreciated with respect to FIGS. 9-12, the present embodiments may include a system architecture for locating and tracking electronic devices in indoor and outdoor environments. The messaging system may support the PubSub communication pattern and may allow publishers and subscribers to publish and receive live messages. Users of certain client electronic devices may want to determine and track other electronic devices, and thus may be both publishers and subscribers of the messaging system. Electronic devices may publish messages to indicate the approximate geolocations of the electronic devices. Users may view the messages corresponding to live approximate geolocations of the electronic devices as the users of the electronic devices move within or about indoor or outdoor environments. For example, as will be described below, the present embodiments may be directed to a schema for collaborative geo-positioning of multiple electronic devices that may improve triangulation accuracy and precision of locating each electronic device of a number of electronic devices by calculating and recording information that may be used to improve accuracy and precision of future approximate geolocations. The present techniques also minimize the amount of information stored on servers that could be used to track and locate devices in indoor and outdoor environments or even worldwide in some examples. In this way, the present embodiments may provide techniques to efficiently determine and track the approximate geolocation of electronic devices within or about indoor and outdoor environments, or otherwise in any of various environments in which large-scale satellite systems may be inaccurate, imprecise, or otherwise unavailable.

Figure 9:
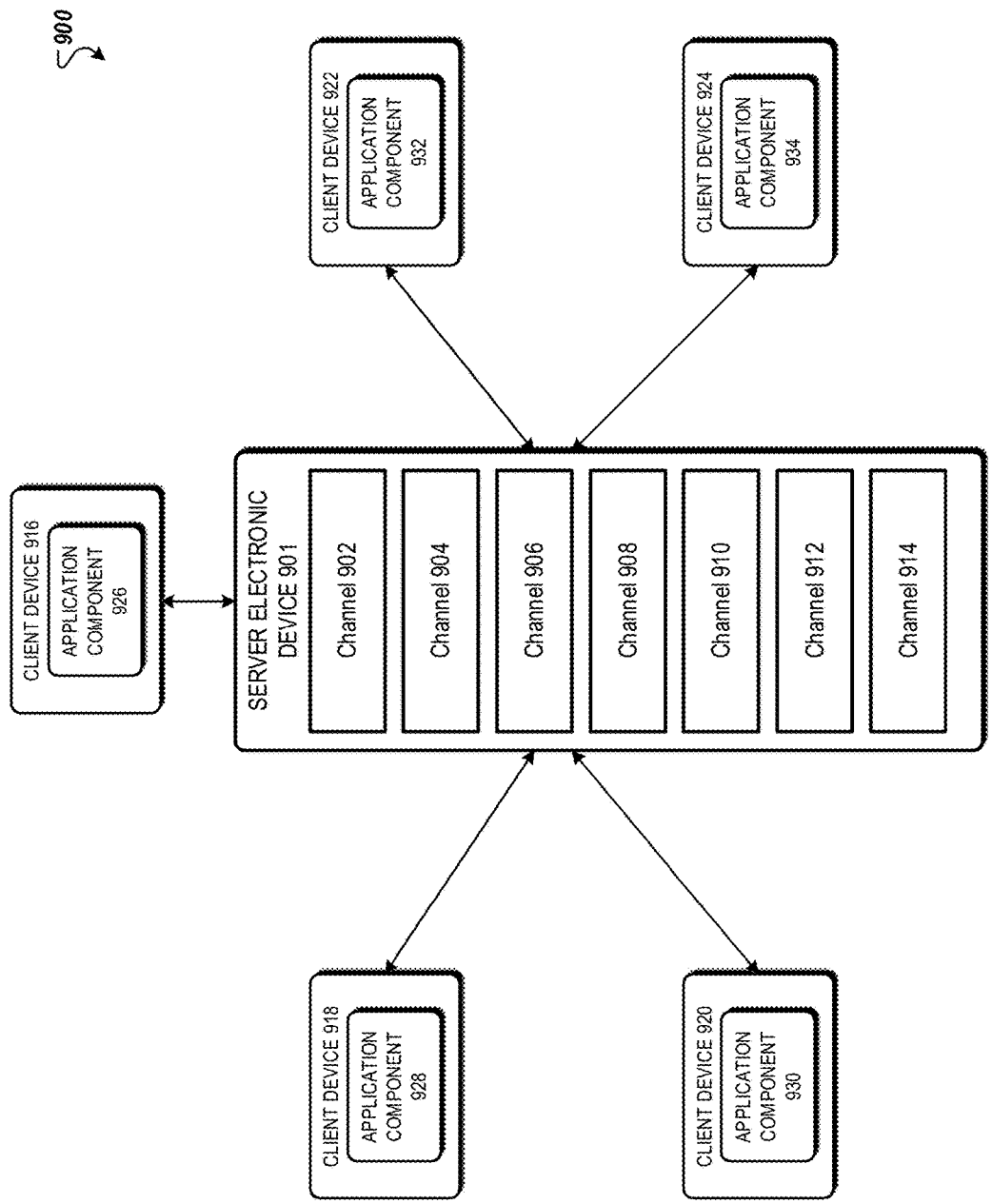
FIG. 9 is a diagram of an example system architecture that may be used to track and locate electronic devices in an environment.

With the foregoing in mind, FIG. 9 is a diagram of an example system architecture 900 that may be used to track and locate client electronic devices stationary or moving within or about, for example, the environment 801. In accordance with at least some of the present embodiments, the system architecture 900 may include a geo-positioning network (GPSNET), and, in some embodiments, may correspond to the system 100 discussed above with respect to FIGS. 1A and 1B. For example, as depicted, the system architecture 900 may include a server electronic device 901 (or numerous server electronic devices 901) and a number of client electronic devices 916, 918, 920, 922, and 924 (e.g., corresponding to one or more of the nodes 804, 806, 808, 810, 812, 814, 816, 818, 820, 822, and 824 discussed in FIG. 8) that may be in communication with the server electronic device 901. The server electronic device 901 may support the PubSub communication pattern, as described earlier in reference to FIGS. 1A through 5D. In some embodiments, the server electronic device 901 may be referred to as a PubSub system or a PubSub messaging system. As illustrated, the server electronic device 901 may include, for example, a channel 902, a channel 904, a channel 906, a channel 908, a channel 910, a channel 912, and a channel 914. The messages published to channels 902, 904, 906, 908, 910, 912, and 914 (e.g., channel streams) may be divided into streamlets, which may be stored within Q nodes or one more databases of the server electronic device 901, as generally described, for example, earlier in reference to FIGS. 1A through 5D. C nodes of the messaging system may be used to offload data transfers from one or more Q nodes (e.g., to cache some of the streamlets stored in the Q nodes).

In certain embodiments, the client electronic devices 916, 918, 920, 922, and 924 may establish respective persistent connections (e.g., TCP communications or other similar communications channels) to one or more MX nodes. The one or more MX nodes may serve as termination points for these connections, as described earlier in reference to FIGS. 1A through 5D. As further illustrated, each of the client electronic devices 916, 918, 920, 922, and 924 may include one or more respective application components 926, 928, 930, 932, and 934, which may, for example, allow users to subscribe to and publish to the channels 902, 904, 906, 908, 910, 912, and 914 of the server electronic device 901. For example, the server electronic device 901 may authenticate users and determine whether users are allowed to publish to certain channels 902, 904, 906, 908, 910, 912, and 914, in some embodiments.

Figure 10:
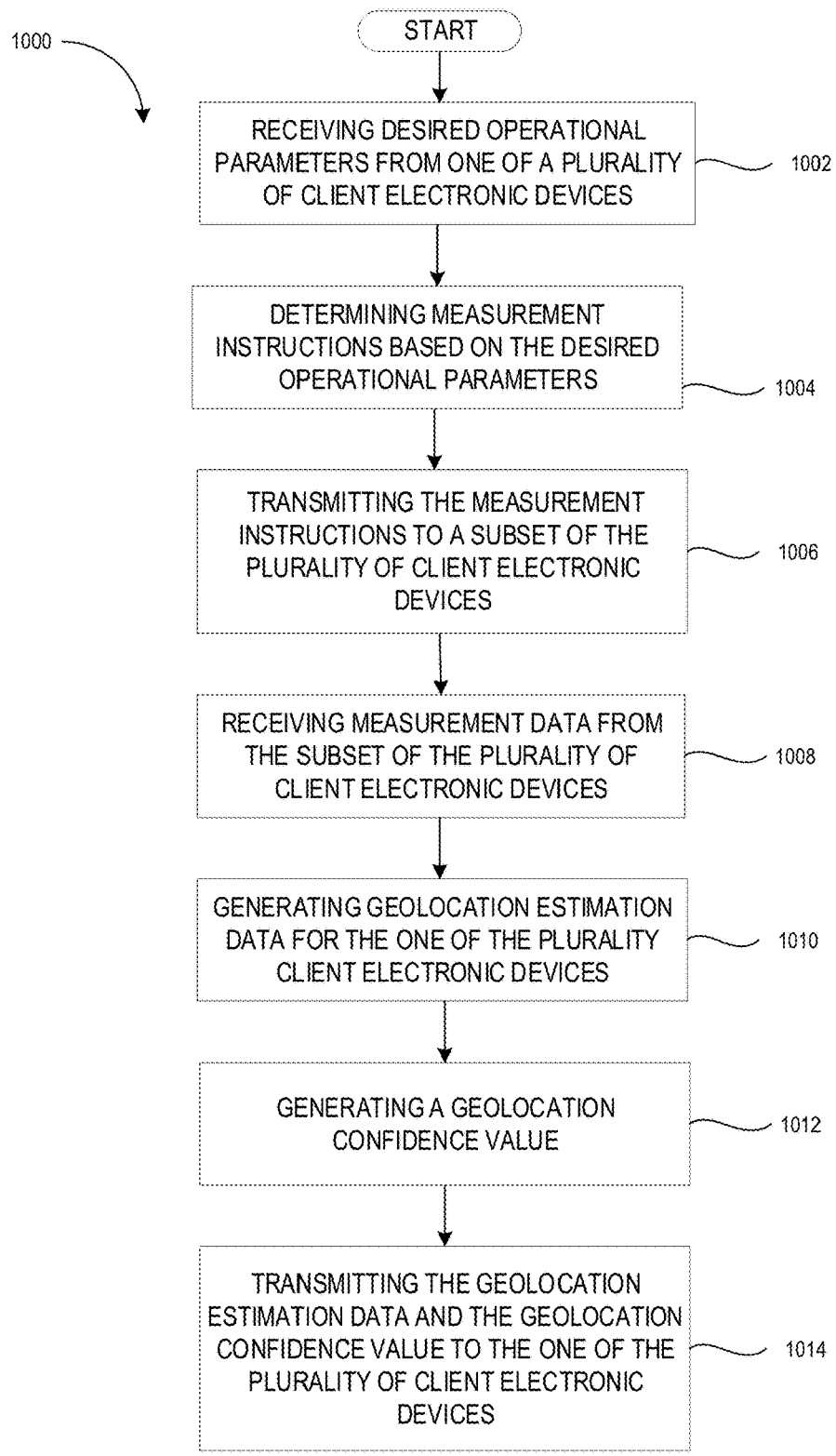
FIG. 10 is a flowchart of an example method for determining and tracking the approximate geolocation of electronic devices in an environment.

Turning now to FIG. 10, which illustrates a flow diagram of a method 1000 of determining and tracking the approximate geolocation of one or more client electronic devices (e.g., client electronic devices 916, 918, 920, 922, and 924 discussed with respect to FIG. 9) in accordance with the present embodiments. In certain embodiments, the method 1000 may be performed by processing logic that may include hardware such as one or more computer processing devices, software (e.g., instructions running/executing on a computer processing device), firmware (e.g., microcode), or a combination thereof, such as the server electronic device 901 discussed above with respect to FIG. 9. For the purpose of illustration and breadth, henceforth, the method 1000 of FIG. 10, the method 1100 of FIG. 11, and the method 1200 of FIG. 12 will be described in conjunction with various examples and in reference to FIGS. 8 and 9 to illuminate and delineate the present techniques.

The method 1000 of FIG. 10 may begin with a computer processing device of the server electronic device 901 receiving desired operational parameters from one or more of a plurality of client electronic devices (Step 1002). For example, referring again to FIG. 9, one or more of the client electronic devices 916, 918, 920, 922, and 924 may transmit a request to the server electronic device 901 in which the request may include a message to the server electronic device 901 updating, for example, user preferences. In some embodiments, the user preferences may be updated by the application components 926, 928, 930, 932, and 934 running on the client electronic devices 916, 918, 920, 922, and 924, and may include, for example, desired operational parameters such as frequency, accuracy, power consumption, processing capacity, bandwidth, hardware usage, and similar operational parameters that may be specified by a user of the client electronic devices 916, 918, 920, 922, and 924.

For example, frequency may include a measurement of time specifying the interval at which the server electronic device 901 may endeavor to produce a location estimate. Similarly, accuracy may include a measurement of distance d and a measurement of probability p, specifying that the server electronic device 901 may endeavor to return delivery confidences such that there is a p-percent or greater probability that the client electronic devices 916, 918, 920, 922, and 924 true location is within d distance of the delivered estimate. Power consumption, for example, may include two unit-less values indicating, for example, a user's willingness to sacrifice desired frequency and accuracy in exchange for lower power consumption (e.g., battery usage). Processing capacity may include two unit-less numbers indicating, for example, a user's willingness to sacrifice desired frequency and accuracy in exchange for lower processing robustness. Lastly, other hardware usage may include two unit-less values per additional hardware resource indicating, for example, the user's willingness to sacrifice desired frequency and accuracy in exchange for instructions that use fewer hardware resources of the server electronic device 901.

The method 1000 may continue with one or more computer processing devices of the server electronic device determining measurement instructions based on the desired operational parameters (Step 1004). For example, the server electronic device 901 may generate and provide instructions to one or more of the client electronic devices 916, 918, 920, 922, and 924 to ping one or more other client electronic devices 916, 918, 920, 922, and 924, measure data (e.g., distance data between client electronic devices), and report the measured and captured data back to the server electronic device 901. Specifically, in certain embodiments, the server electronic device 901 may estimate the approximate geolocation of one or more of the client electronic devices 916, 918, 920, 922, and 924 by sending instructions to at least some of the client electronic devices 916, 918, 920, 922, and 924 to ping, measure, and report their measurements (e.g., distance data, velocity data, acceleration data, accelerometer data, magnetometer data, gyroscope data, GPS data, and so forth). In some embodiments, the measurement instructions provided by the server electronic device 901 may be specific to each of the client electronic devices 916, 918, 920, 922, and 924 and may be based on, for example, the desired operational parameters (e.g., frequency, accuracy, power consumption, processing capacity, bandwidth, hardware usage, and so forth) received in the request.

The method 1000 may continue with one or more computer processing devices of the server electronic device transmitting the measurement instructions to at least a subset of the client electronic devices (Step 1006). For example, the server electronic device 901 may send each or a subset of the client electronic devices 916, 918, 920, 922, and 924 an instruction message, which may include, for example, a decision-tree indicating which instruction steps should be executed and at which time. Specifically, each measurable outcome of an execution may then determine which instruction step or execution to perform next.

In certain embodiments, the instructions provided by the server electronic device 901 to the client electronic devices 916, 918, 920, 922, and 924 may be structured such that when one of the client electronic devices 916, 918, 920, 922, and 924 is instructed to measure, then the server electronic device 901 has already calculated that a probability threshold (e.g., high enough probability) has been achieved, thus indicating that the measurement is likely to be successful in measuring, for example, a physical distance, a signal intensity, a pattern, an image, distance data, RF signal intensity data, latency data, response time data, image data, audio data, voice data, biometric data, video data, temperature data, humidity data, atmospheric data, light data, magnetic data, social media data, or other measurement data that may improve certainty in future geolocation calculations to be performed by the server electronic device 901.

In some embodiments, for example, the server electronic device 901 may determine whether the probability threshold (e.g., minimum acceptable probability or above 50% probability, above 60% probability, above 70% probability, above 80% probability, above 90% probability) has been achieved based on whether another client electronic device 916, 918, 920, 922, and 924 has been instructed to ping, or whether that particular client electronic device has met a probability threshold (e.g., minimum acceptable probability or above 50% probability, above 60% probability, above 70% probability, above 80% probability, above 90% probability) with respect to being nearby. The server electronic device 901 may also determine whether the probability threshold (e.g., minimum acceptable probability or above 50% probability, above 60% probability, above 70% probability, above 80% probability, above 90% probability) has been achieved based on whether the particular client electronic device has been instructed to set hardware parameters to values that have a high probability (e.g., probability is high enough) with respect to being compatible with the measurement parameters captured, for example, by the initial client electronic device.

In other embodiments, for example, the server electronic device 901 may determine whether the probability threshold (e.g., minimum acceptable probability or above 50% probability, above 60% probability, above 70% probability, above 80% probability, above 90% probability) has been achieved based on whether there is an object with, for example, a quasi-permanent location and that is transmitting a signal, an image, audio data, voice data, biometric data, video data, temperature data, humidity data, light data, magnetic data, social media data, or other similar identifiable measurement data that can be detected by any of the client electronic devices 916, 918, 920, 922, and 924 or the server electronic device 901 with a minimum acceptable probability. In certain embodiments, as previously noted, the client electronic devices 916, 918, 920, 922, and 924 may process the outcome of each instructed execution and refer again to the decision-tree of the instructions to determine a manner in which to proceed. For example, in one embodiment, a pair of the client electronic devices 916, 918, 920, 922, and 924 may be instructed to ping and measure at the same time using a set of possible parameters, and once the pair successfully transfers a message, the pair may be instructed to terminate and report.

In certain embodiments, the terminal action of each instruction decision-tree, regardless of any outcomes, is either the command to "wait" for further instruction or the command to report back to the server electronic device 901. If the client electronic device 916, 918, 920, 922, and 924 is commanded to report, then the information utilized to complete this action (e.g., which measurements to report and what formatting to use) may be included in that command in the instructions. It should be appreciated that the measurement instruction messages provided to the client electronic devices 916, 918, 920, 922, and 924 by the server electronic device 901 may include any number of instructions or sets of instructions. For example, the instructions may be any number of actions (e.g., measure, ping, alert, report, store, pause processing messages for a period of time, and so forth) to be performed by one or more of the client electronic devices 916, 918, 920, 922, and 924.

In certain embodiments, identification data may also be sent within each type of message. For example, identification data may be included in the initial request from the client electronic devices 916, 918, 920, 922, and 924 to the server electronic device 901, as well as in the ping message sent from, for example, one or more of the client electronic devices 916, 918, 920, 922, and 924 to one or more other client electronic devices 916, 918, 920, 922, and 924. In some embodiments, because each of the client electronic devices 916, 918, 920, 922, and 924 that are near each other in both space and time may report to the same server electronic device 901, each client electronic devices 916, 918, 920, 922, and 924 may choose to divulge their respective data in limited form: not at all times, or not to all parties, or not in complete form, or not in continuous form. An example of incomplete divulgence includes the use of a hashed identification number in place of its full unencrypted literal. An example of an non-continuous form of divulgence includes changing a client's identification number to a new identification number unlinked to the previous, for example.

The method 1000 may continue with the one or more computer processing devices of the server electronic device receiving measurement data from at least the subset of the plurality of client electronic devices (Step 1008). In certain embodiments, the server electronic device 901 may utilize these measurements to triangulate the client electronic devices 916, 918, 920, 922, and 924 (or a subset thereof) as part of the present techniques to determine the approximate geolocations of the client electronic devices 916, 918, 920, 922, and 924 within or about the environment 801. For example, the server electronic device 901 may identify one or more particular client electronic devices 916, 918, 920, 922, and 924 whose current need for accuracy is higher than the current estimated ability of the server electronic device 901 to provide such an accurate estimate.

The server electronic device 901 may then utilize, for example, a database to identify a list of client electronic devices 916, 918, 920, 922, and 924 and those objects (e.g., permanently positioned objects or quasi-permanently positioned objects within or about the environment 801) that are nearby with a minimum acceptable probability (e.g., above a certain percentage). For example, one or more databases of the server electronic device 901 may be utilized to codify the user behavior that is likely to be performed by which client electronic devices 916, 918, 920, 922, and 924 at which times for each possible location 802, for example. In some embodiments, this information may be stored efficiently by geographically sectioning the environment 801 and accumulating summary information about each section and/or each location 802. Specifically, the server electronic device 901 may utilize the longitude, latitude, and altitude axes to section the captured and stored information and generate, for example, a collectively exhaustive and mutually exclusive (CEME) sectioning system.

In certain embodiments, the server electronic device 901 may generate the CEME sectioning system by forming a CEME set of latitude intervals. For example, in one embodiment, letting [0-1] be the set of all latitudes between 0.0 and 1.0 degrees, the server electronic server device 901 may generate, for example, intervals [−90,−89], [−89,−88], [−1, 0], [0-1], [1-2], [2-3], . . . [88-89], and [89-90] (e.g., up to approximately 180 intervals) as a valid CEME set. Specifically, the server electronic device 901 may form a CEME set of latitudes and form a CEME set of altitudes by, for example, executing a Cartesian crossing of the CEME set of latitudes and the CEME set of altitudes to form a 3-dimensional (3-D) CEME sectioning of space of the environment 801, for example. For example, in one embodiment, [0,−1], [0-1], and [0,1] may include the cube-like area (which may be referred to herein as a "cube") of space on latitudes between 0.0 and 1.0 degrees, on longitudes between 0.0 and 1.0 degrees, and on altitudes between 0.0 to 1.0 meters above a determinable altitude level. For each "cube," the server electronic device 901 may create another CEME sectioning of 3-D space, further dividing the "cube" into smaller "cubes," for example. In some embodiments, the server electronic device 901 may repeat this process, for example, to increase resolution over time. The server electronic device 901 may also utilize the CEME sectioning as an index to identify which databases of the server electronic device 901 are available and for which regions are the databases available. In some embodiments, for example when a database is added to the server electronic device 901, the added database may find all "cubes" of all sizes for which it has information.

In certain embodiments, each database of the server electronic device 901 may then store, for example in some sortable order, a list of defined 3-D enclosures and information about the enclosures. The enclosures might include, for example, the location of certain obstructions or constructions (e.g., walls, islands, columns, pillars, and so forth) or other quasi-permanent objects that may at least partially skew or otherwise prevent measurement data. The information stored by the server electronic device 901 may include, for example, which types of signals the objects obstruct, the degree of obstruction (e.g., level of obstruction), the location of "user hotspots" or other frequently visited spots by users, the time-of-day and day-of-week the "user hotspots" are frequented, the probability of users being at the "user hotspots" at certain times, the probability of users being at the "user hotspots" at certain times given the user, for example, was within a certain radius at another time. The information stored by the server electronic device 901 may also include, for example, the delay of hardware signaling devices, formulas for calculating estimated distance for each make and model of client electronic devices 916, 918, 920, 922, and 924, the location of, for example, pedestrian, automobile, train, and other similar pathways of the environment 801, a list of enclosed areas of the environment 801, and the distribution of observed speeds of client electronic devices 916, 918, 920, 922, and 924 moving through certain areas. The information stored by the server electronic device 901 may also include, for example, functions indicating how that probability distribution varies over time-of-day and day-of-week, functions indicating how that distribution varies according to the make and model of the client electronic devices 916, 918, 920, 922, and 924, and so on and so forth.

In some embodiments, the server electronic device 901 may calculate and store certain predictions with respect to users of the client electronic devices 916, 918, 920, 922, and 924. For example, in one embodiment, some prediction values may depend on, for example, the current weather forecast or other similar data. Such data, for example, may be utilized by the server electronic device 901 to learn some behavior of the user and make one or more predictions regarding, for example, the demographics and possible locations of the user. In another embodiment, the user may voluntarily input some additional personal or observed information utilizing, for example, one or more applications running on the client electronic devices 916, 918, 920, 922, and 924 such as the application components 926, 928, 930, 932, and 934 previously discussed. Such data may be received and stored by the server electronic device 901 and may be utilized, in some embodiments, in determining present or future measurement instructions to provide to the client electronic devices 916, 918, 920, 922, and 924.

In some embodiments, as part of a delivery message, the server electronic device 901 may also calculate the maximum probable geographic location of the message source and destination. Thus, for a message m, the server electronic device 901 may calculate the most likely points x and y that the message m may be sent and received. The location estimations x and y may be constantly updated by the server electronic device 901. After some amount of time after each message m is reported, the server electronic device 901 may generate an estimate for the approximate geolocation of that message's endpoint locations x and y. That message m may include a hardware type, and may thus include an implied distance d, which as will be further appreciated below with respect to Step 1010 of FIG. 10, may be utilized by the server electronic device 901 to infer distance (e.g., distance with respect to the client electronic devices 916, 918, 920, 922, and 924) as part of the geolocation estimation calculation.

In certain embodiments, the server electronic device 901 may also utilize a CEME set of intervals in location, velocity, and other suitable or desirable information to store a distribution of observed velocities. For example, a distribution may be based on device ID or certain other distributions may be based on location (e.g., "cubes" and enclosures). Angular velocity and acceleration may be estimated, for example, for every three consecutive geolocation estimates. The server electronic device 901 may weigh recent information as more indicative of present outcomes by utilizing, for example, one or more supervised learning and cross-validation tuning techniques. In this way, the server electronic device 901 may predict behavior and possible measurement or signal outcomes. The server electronic device 901 may also generate and provide different levels of confidence for the probable estimations, as will be appreciated in greater detail with respect to Step 1012 of FIG. 10.

For example, in some embodiments, the server electronic device 901 may initially observe that a user ID associated with a particular one of the client electronic devices 916, 918, 920, 922, and 924 spends time evenly between two locations. However, once unsupervised analysis is performed, the server electronic device 901 may determine that the distribution of locations varies significantly between, for example, before noon (e.g., morning) and afternoon (e.g., midday to late evening) each day. Thus, the server electronic device 901 may henceforth also store the morning and afternoon distributions for that particular user ID and client electronic device, for example. Furthermore, as contiguous "cubes" are identified as having similar properties (for one or more data types), the server electronic device may define a new enclosure. For example, large pathways such as large stretches of major highways may be grouped into enclosures to represent, for example, the distribution of traffic speed observed in each lane and at what time of day and day-of-week. In such a case, the server electronic device 901 may utilize unsupervised learning or clustering to determine which contiguous "cubes" to utilize to make a new enclosure. Specifically, in accordance with the present techniques, the server electronic device 901 may accumulate behavioral maps (e.g., user specific patterns) such as road maps, pedestrian walkways, building maps, air density maps, signal interference maps, and the like.

For example, in the example in which a company adds a new building to its campus (e.g., environment 801) and the client electronic devices 916, 918, 920, 922, and 924 send requests while corresponding users walk throughout the new campus building, the server electronic device 901 may incrementally update its determination about each square foot of the area to reflect (e.g., based on fuzzy logic) a sense of the location of, for example, the roads, walls, furniture areas, islands, columns, frequent walk-paths, metal-plates, the location and basic shape of highly unique images, and favorite work spots, walking speeds of the company employees, frequent visitors, and so forth with respect to the new campus building. The server electronic device 901 may then utilize this information to predict the probable location and velocity of current visitors and the probable distance of a measurement reading based upon the historical behavior and signal interference of previous observations, for example. As another example, if users of the client electronic devices 916, 918, 920, 922, and 924 are walking past the front door of the new campus building and, for example, the client devices include a magnetic imaging measurement device, the server electronic device 901 may detect a strong signal to the users' East, for example, over time. The server electronic device 901 may utilize that additional real-time information to further triangulate the approximate geolocation of a client electronic device 916, 918, 920, 922, and 924 currently requesting a geolocation estimate, for example.

In certain embodiments, when one or more of the client electronic devices 916, 918, 920, 922, and 924 reports its findings, the server electronic device 901 may utilize the information to validate or correct the previous expectations or assumptions that formed the foundation of prior decisions (e.g., determine with certainty whether the server electronic device 901 now have enough information to meet the user preferences, whether the client electronic devices and objects that the server electronic device 901 calculated were nearby with high probability are indeed nearby, whether additional client electronic devices and objects have moved or remain stationary, whether additional user preferences have been received by the server electronic device 901, etc.).

The method 1000 may continue with the one or more computer processing devices of the server electronic device generating geolocation estimation data for the one or more client electronic devices (Step 1010). For example, in certain embodiments, the server electronic device 901 may estimate the approximate geolocation of the client electronic devices 916, 918, 920, 922, and 924 by utilizing, for example, supervised learning on the probable location of a device ID based upon its historical distribution, the probable distances between the client electronic devices 916, 918, 920, 922, and 924, based on the measurement data, the probable distance between each of the client electronic devices 916, 918, 920, 922, and 924 and known obstructions (e.g., walls, magnetic fields, object images, and so forth), and the probable velocities and accelerations of the client electronic devices 916, 918, 920, 922, and 924 based upon, for example, the historical distribution of the device ID and the location historical distribution of the environment 801.

In certain embodiments, for each delivery message, the server electronic device 901 may determine an estimated location, x=(lat, lon, alt), a radius=r, and a probability of one or more of the client electronic devices 916, 918, 920, 922, and 924 being within that distance of the estimate=p. For each client electronic device 916, 918, 920, 922, and 924 respective device ID i, and for each "cube" of environment 801 space, the database of the server electronic device 901 may keep track of a cumulative score by, for example, adding "points" at each iteration to a running tally. In one embodiment, for some monotonically increasing functions $f$ and $g$, whenever the server electronic device 901 sends a delivery message with (x, r, p), then $$\text{points}(y) = \frac{f(p, r^{-1})}{g(\text{distance}(x, y))},$$

with distance (x, y) defined as the average Euclidean distance between x and the set of points that constitute "cube" y. After each delivery message, the server electronic device 901 may cumulate the points at each "cube" by computing, for example, cumulative points(y)+=points(y). Thus, at any moment in time, for any CEME set of "cubes" C, the server electronic device 901 may estimate the prior probability that a particular client electronic device 916, 918, 920, 922, and 924 is located in any "cube" y (that belongs to C) as:

$$\text{prior}(i, y) = \frac{\text{cumulative points }(y)}{\sum_{z \in C} \text{cumulative points }(z)}$$

In another embodiment, the server electronic device 901 may estimate the conditional probability that a particular client electronic device 916, 918, 920, 922, and 924 is located in "cube" y (given that it is located in a larger "cube" Y), where there exists a set of CEME "cubes" C, such that Y=Union(C), and wherein y enclosed fully by Y:

$$\text{conditional}(i, y \mid Y) = \frac{\text{cumulative points }(y)}{\sum_{z \in CEME(Y)} \text{cumulative points }(z)}$$

In certain embodiments, to ensure that these probabilities match a realistic determination, for example, the server electronic device 901 may initialize the cumulative points of each cube with third-party data about the human density of the environment 801. The server electronic device 901 may also, in some embodiments, utilize a Bayesian smoothing technique to ensure that these probabilities match a realistic determination. For example, the server electronic device 901 may initialize the cumulative points of each "cube" with some small value proportional to its volume, as illustrated by the equation set forth below:

cumulative points at first instance of ID=$h$(volume (y)), for some monotonically increasing $h$ In another embodiment, to ensure that these probabilities match a realistic determination, the server electronic device 901 may generate and assign a penalty to, for example, the assumption or the expectation that a particular client electronic device 916, 918, 920, 922, and 924 is in a particular location, as set forth by the equation below:

Location loss(y,i)=$f$(prior(y,i))

for some monotonically decreasing function, $f$

In certain embodiments, as previously discussed above, whenever a geolocation estimate is completed, the server electronic device 901 may calculate a residual by comparing the distance implied by the geolocation estimate and the raw estimated distance. For example, the residuals may include a constant stream of supervised feedback upon which, for example, a sophisticated model may be generated by the server electronic device 901. For example, in certain embodiments, the server electronic device 901 may generate a sophisticated model that may learn multiplicative, linear, and complex biases based on the available context information (e.g., the requesting device ID, the pinging device ID, the time of day, the weather, the hardware settings, the make and model of the hardware, and so forth). For example, in or more embodiments, the server electronic device 901 may cause the model to be trained online, and may thus provide access to a context-bias adjusted estimated (CBAE) distance. The server electronic device 901 may then input the raw estimated distance and the known and available context information. The generated model may then return a prediction that is equal to, for example, the CBAE distance.

In some embodiments, for any two locations x and y (e.g., which may be represented as vectors in some embodiments), the server electronic device 901 may determine an actual distance equal to the Euclidean distance between the two locations x and y. For example, as previously discussed above, for each possible message type and for each possible location, the server electronic device 901 may store (e.g., utilizing "cubes" and/or enclosures) the observed bias between the implied distance of the final geolocation estimation and the implied distance of the measurement data. Integrating these known biases from location x to location y, the server electronic device 901 may calculate the location-bias adjusted estimated (LBAE) distance. Thus, for any two points (x, y) and any measurement m, the difference between LBAE(x, y) and CBAE(m) may include the implied residual or error in measurement m, given that the measuring client electronic device and pinging client electronic device are located at locations x and y. In some embodiments, in order to discover which assumed geolocations of the client electronic devices 916, 918, 920, 922, and 924 minimize measurement loss, the server electronic device 901 may define an error function as set forth below:

measurement loss$(x,y,m)=h(|CBAE(m)-LBAE(x,y)|, CBAE(m))$ for some $h(\cdot,\cdot)$, monotonically increasing in the first argument For example, in some embodiments, the server electronic device 901 may define an error penalty associated with each of the possible two locations x and y, for example, by comparing the measurement expected based on both the known available context (e.g., device make-model, device ID, weather, time, and so forth) and the historical biases observed in the "cubes" and enclosures in between locations x and y to the implied distance measurement. In the above error function, the difference calculation is proportional to the error calculation.

In certain embodiments, the client electronic devices 916, 918, 920, 922, and 924 may be utilized to process complex messages when attempting to measure, for example, an object. For example, the client electronic devices 916, 918, 920, 922, and 924 may each include a camera or other data capturing device, which may, at least in some embodiments, receive a 2-D image array corresponding to the captured image of the measured object. In certain embodiments, in order to assimilate these messages into the server electronic device 901, the server electronic device 901 may rely upon, for example, the possibility that all messages (e.g., both relatively simple and more complex messages) may be compared to other messages of the same type and saved in the database of the server electronic device 901. Specifically, for each hardware type, the server electronic device 901 may determine a similarity function that compares the received message with the average message received at a known location. Thus, the server electronic device 901 may rely upon each hardware type having a similarity-score function that compares the message information m with any retrieved message from the database i, as illustrated by the following equation:

similarity$_h(m,i)$, for each hardware type h with range=[0,1]

In certain embodiments, for each hardware type, message, and comparison message, the client electronic devices 916, 918, 920, 922, and 924 may estimate distance between, for example, the camera and the image under the assumption that the measurement data includes the comparison object. For example, given the aperture and focal length of a camera of the client electronic devices 916, 918, 920, 922, and 924, and the known size of an object, the client electronic devices 916, 918, 920, 922, and 924 may estimate the distance between the object and the camera by its relative size inside the image. In some embodiments, the server electronic device 901 may rely on each measuring hardware type (e.g., camera or other data capturing device) having a distance estimation $OE_{h,i}(m)$ (e.g., object estimated [OE] distance) for each hardware type h and each assumed object i. In one or more embodiments, the server electronic device 901 may define measurement loss in this case as:

measurement loss$(x,i,m)=\min(f($similarity$_h(m,i),g$
$(|OE_{h|i}(m)-LBAE(x,y)|,OE_{h|i}(m))$ where y=the location of i where h is the hardware of m for some monotonically increasing functions f and g For example, in certain embodiments, as may be ascertained by the above equation, the server electronic device 901 may define an error penalty associated with each possible client electronic device 916, 918, 920, 922, and 924 location x and by comparing the measurement expected based on the hardware formula and the historical biases observed in the "cubes" and enclosures between location x and the known location of the object, y. In some embodiments, possible types of error may include, for example, the possibility that an object of interest was not the actual object included in the measurement data, and the possibility that the distance calculation between the camera or other data capturing device of the client electronic device 916, 918, 920, 922, and 924 and the object is at least partially inaccurate.

Thus, the server electronic device 901 may determine a compromise between the two possible errors by computing the error (e.g., a unit-less value) of each, and then calculating and utilizing the minimum of the two possible errors. In some embodiments, if the server electronic device 901 determines that the first possible error type is less than the other possible error type, then the server electronic device 901 may determine that the overall error is monotonically increasing in the similarity score returned. Specifically, the server electronic device 901 may determine that the penalty of rejecting the image or other captured measurement data as correct is high when the similarity is high. On the other hand, if the server electronic device 901 determines that the second error possible type is less than the first possible error type, then the server electronic device 901 may determine that the overall error decreases when the estimated distance from the objection information calculation OE is closer to the location adjusted distance between the two locations x and y and increases when these two values diverge.

In certain embodiments, the server electronic device 901 may also estimate the velocities and accelerations of the client electronic devices 916, 918, 920, 922, and 924 at various times. Specifically, another type of error is the error incurred by assuming that a particular client electronic device 916, 918, 920, 922, and 924 is at position $x_{t1}$ and at time $t_1$ and at another position $x_{t2}$ at time $t_2$. For example, the server electronic device 901 may determine that there should be a large error incurred if $x_{t1}$ and $x_{t2}$ are far enough apart that $(t_2-t_1)$ and the historical velocity of the particular client electronic device 916, 918, 920, 922, and 924 and the historical velocity at or near this location. Specifically, for each consecutive time $t_{i-1}$, $t_i$, and $t_{i+1}$, the server electronic device 901 may calculate velocity and acceleration error of, for example, particular client electronic device 916, 918, 920, 922, and 924 as:

$$\text{user velocity loss}(v_i, v_{i+1}) = f(p(v_i, v_{i+1} | \text{user ID} = i))$$

for some decreasing function $f$

Similarly, the server electronic device 901 may calculate velocity and acceleration error of, for example, particular client electronic device 916, 918, 920, 922, and 924 as:

$$\text{location velocity loss}(v_i, v_{i+1}) = f(p(v_i, v_{i+1} | \text{location} = x_t))$$

for some decreasing function $f$

In certain embodiments, the server electronic device 901 may calculate specific geolocation estimates of any of the client electronic device 916, 918, 920, 922, and 924. For example, in certain embodiments, if the current time is T, then the server electronic device 901 may considers all measurements by all devices in the last delta(t) minutes, which delta (t) is a global lookback parameter of the sever electronic device 901. For example, the number of measurements may be finite, then there is a finite set of times in [T-delta(t), T]. Having retrieved the set of all measurements in the lookback window, and having the list of all sending client electronic devices 916, 918, 920, 922, and 924 and all possible pinging device IDs of client electronic devices 916, 918, 920, 922, and 924, the server electronic device 901 may generate a geolocation estimate by solving for the estimated geolocations of each of the client electronic devices 916, 918, 920, 922, and 924 concurrently.

In some embodiments, the server electronic device 901 may also minimize, for example, the total error over all sets of possible environment 801 positions of each client electronic devices 916, 918, 920, 922, and 924. Specifically, in some embodiments, the server electronic device 901 may declare the position of each connection ID x€X at each time t€{T}, $x_t$ to be a variable. The server electronic device 901 may then utilize, for example, a non-linear optimization technique to calculate a solution that minimizes the total error objective function (e.g., corresponding to a function of those variables). The server electronic device 901 may keep track of all connection IDs used within this lookback regardless of whether they are currently active connections or not. In some embodiments, another variable in the total error function is the probability that a particular client electronic device 916, 918, 920, 922, and 924 with connection ID c and device ID i, is the actual pinger for message m (e.g., for each message m) in the current lookback window of the type that may include a pinging device pinger(m, c). In one embodiment, the server electronic device 901 may restrict pinger(m, c) to only non-negative values (e.g., non-negative integers) to ensure that pinger(m, c) may include a valid set of probabilities (e.g., pinger(m, c)>0).

In certain embodiments, to account for the possibility that an unknown occurrence caused the appearance of a ping, the server electronic device 901 may calculate and assign a pinger loss penalty, as set forth below:

$$\text{pinger loss}(m) = f_h(1 - \Sigma_c \text{pinger}(m,c))$$

for some monotonically increasing function, $f_h$ where $h$ is the hardware of $m$ As may be ascertained from the above equation, $1-\Sigma_c\text{pinger}(m, c)$ may refer to the probability that an unknown occurrence occurred, and the server electronic device 901 may assign an increasing penalty based on the unknown occurrence. In certain embodiments, the penalty may vary according to hardware type, as some types of hardware components may be more susceptible to such an occurrence. Further, in some embodiments, if a particular client electronic device 916, 918, 920, 922, and 924 is known not to have the hardware necessary to perform a ping message, then that device may not considered: (pinger(m, c)=0). Additionally, if a message is of a hardware type that includes a particular pinging client electronic device 916, 918, 920, 922, and 924 being instructed to ping, then the client electronic devices 916, 918, 920, 922, and 924 that do not meet a defined criteria may not be considered.

For example, in one embodiment, the defined criteria may be based on whether the particular pinging client electronic device 916, 918, 920, 922, and 924, for example, received an instruction to ping on a compatible hardware setting before the message timestamp within a lookback horizon. In another embodiment, the defined criteria may be based on whether either the last report received by the particular pinging client electronic device 916, 918, 920, 922, and 924 was before the instruction, or whether, for example, the first report received by the server electronic device 901 after the instruction was also after the message timestamp. The defined criteria may thus prevent any client electronic device that could not have been the particular pinging client electronic device 916, 918, 920, 922, and 924 from being attributed any probability density in the solution to the total-loss function. Another variable in the total error function may include the probability that object o was the measured object for message m (e.g., for each message m in the current lookback window) of the type that include an object placement (m, o). In one embodiment, the server electronic device 901 may restrict placement (m, o) to only non-negative values (e.g., non-negative integers) to ensure that placement (m, o) may include a valid set of probabilities (e.g., placement(m, o)>0).

In certain embodiments, to account for the possibility that an unknown occurrence caused the appearance of a ping, the server electronic device 901 may calculate and assign a placement loss penalty, as set forth below:

$$\text{placement loss} = f_h(1 - \Sigma_o \text{placement}(m,o))$$

for some monotonically increasing function, $f_h$ where $h$ is the hardware of $m$ In certain embodiments, as may be ascertained from the above equation, $1-\Sigma_o$ placement(m, o) may refer to the probability that an unknown occurrence occurred, and the server electronic device 901 may assign an increasing penalty based on the unknown occurrence. As discussed above with respect to the pinger(m, c), in certain embodiments, the penalty may vary according to hardware type, as some types of hardware components may be more susceptible to such an occurrence. Further, in some embodiments, if an object is known not to have the properties necessary, then that object is not considered: (placement(m, o)=0). This may thus prevent any object that could not have been the detected object from being attributed any probability density in the solution to the total-loss function calculated by the server electronic device 901.

In certain embodiments, with the variables X, pinger (m, c), and placement(m, o) defined, the server electronic device 901 may calculate the total loss as:

$$\text{total loss} = \sum_{t \in T} \text{loss}_t$$

$$\text{loss}_t = \sum_c \text{pinger}(m_t, c) * \text{measurement loss } (x_t^c, x_t^c, m_t) +$$

$$\ldots + \sum_o \text{placement}(m_t, o) * \text{measurment loss } (y^i, x_t^c, m_t) +$$

$$\ldots + \sum_c \text{location loss } (l^c, x_t^c) + \ldots +$$

$$\text{user velocity loss } (v_{t-1}, v_t) + \ldots + \text{pinger loss } (m_t)$$

where the sender of message $m_t$ is $s$, and is known where the device ID of device with connection $ID = c$ is $l^c$, and is known where velocity losses are zero when $t - 1 \notin T$ Thus, the server electronic device 901 may calculate the approximate geolocation of each of the client electronic devices 916, 918, 920, 922, and 924. In one embodiment, the server electronic device 901 may minimize the above function subject to the following constraints:

$\text{pinger}(m_t, c) \geq 0$ $\text{placement}(m_t, o) \geq 0$ $\Sigma_o \text{placement}(m, o) \leq 1$ $\Sigma_o \text{pinger}(m, o) \leq 1$ $\text{pinger}(m_t, c) = 0$, when infeasible $\text{placement}(m_t, o) = 0$, when infeasible The method 1000 may continue with the one or more computer processing devices of the server electronic device generating a geolocation confidence value (Step 1012). Specifically, the geolocation estimate may constitute only part of the delivery message. In certain embodiments, the server electronic device 901 may also calculate a geolocation confidence level of the geolocation estimate. In one embodiment, the server electronic device 901 may convey confidence as a confidence interval. For example, a distance d and a probability p combined together by the server electronic device 901 may indicate that the geolocation estimate is accurate enough that p percent of similar geolocation estimates are within d distance of the actual geolocation of the client electronic devices 916, 918, 920, 922, and 924.

In some embodiments, the server electronic device 901 may calculate the geolocation confidence level by monitoring, for example, the gradient of the total loss function. For example, the gradient of a function may include the rate at which the value changes as one of its variables is moved or varied. Specifically, when the gradient of the total loss function is small, the server electronic device 901 may determine that points nearby the estimated geolocation are only slightly less likely than the geolocation estimate itself. In such a case, the server electronic device 901 may determine a low level of confidence. In some embodiments, the server electronic device 901 may link what has been determined from the gradient with what is desired, for example, by a user, and generate a confidence interval or other form of confidence report. The below equation illustrates the foregoing:

$$p_x = g\left(\frac{\partial}{\partial x} \text{Total Loss}, d_x\right)$$

where $d_x$ is the requested delivery radius of device $x$ for some function $g$, monotonically increasing in the first argument and decreasing in the second For example, referring to the equation above, the function g may be improved by selecting the best functions from a family of functions G. The server electronic device 901 may determine which function is best by, for example, adding the client electronic devices 916, 918, 920, 922, and 924 at known locations and ranking possible candidate function g, or, in another embodiment, instructing the client electronic devices 916, 918, 920, 922, and 924 with known locations to rank possible candidate function g.

The method 1000 may then conclude with the one or more computer processing devices of the server electronic device transmitting the geolocation estimation data and the geolocation confidence value to one or more of the client electronic devices 916, 918, 920, 922, and 924 (Step 1014) indicating, for example, the approximate geolocation of each of the client electronic devices 916, 918, 920, 922, and 924 within the environment 801 and a geolocation confidence value indicating, for example, the confidence level that the geolocation estimation is the actual geolocation of each of the client electronic devices 916, 918, 920, 922, and 924. In this way, the present embodiments may provide techniques to efficiently determine and track the approximate geolocation of electronic devices within or about indoor and outdoor environments, or otherwise in any of various environments in which large-scale satellite systems may be inaccurate, imprecise, or otherwise unavailable.

Figure 11:
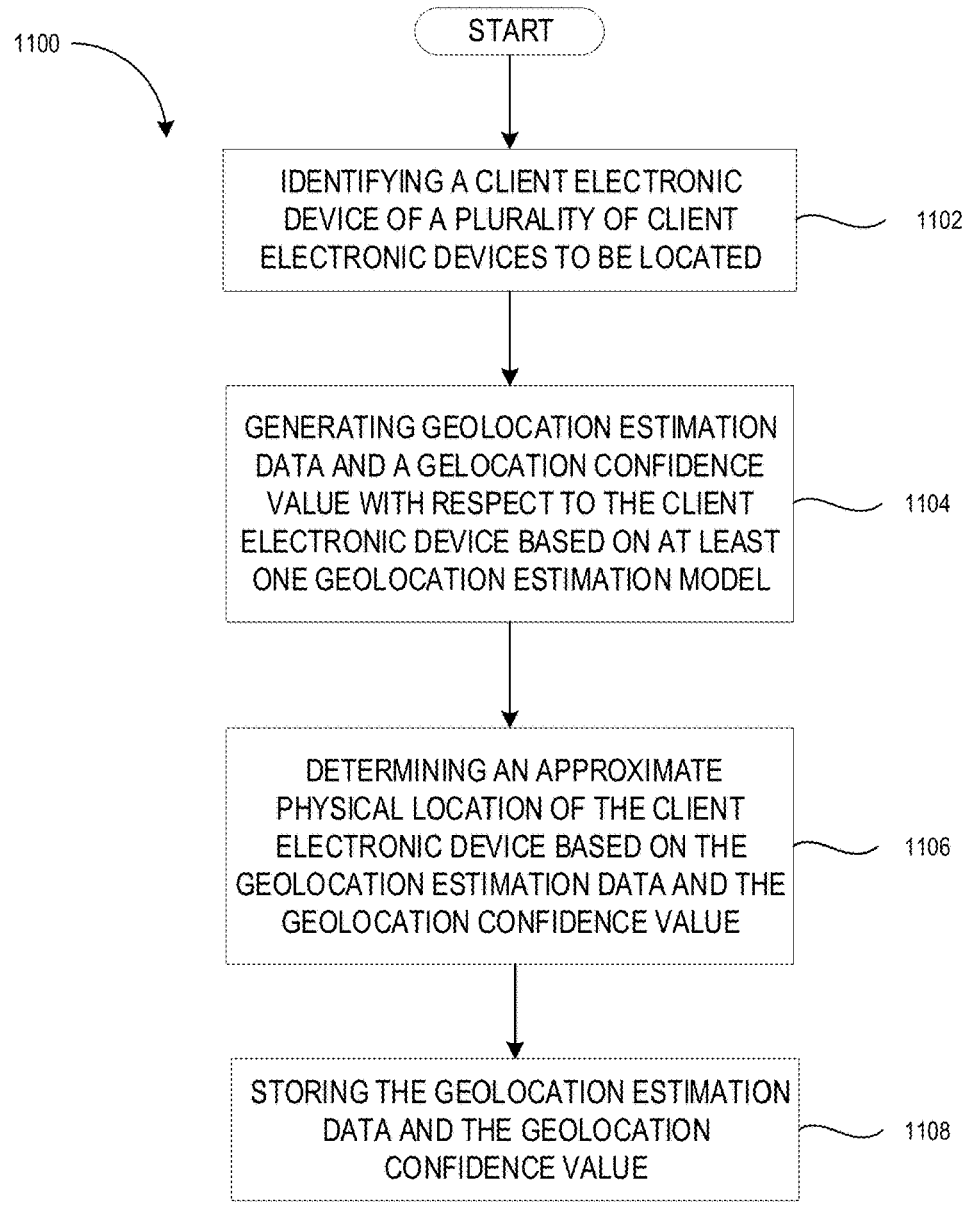
FIG. 11 is a flowchart of an example method for calculating geolocation estimation data and for calculating a geolocation confidence value.

Turning now to FIG. 11, which illustrates is a flow diagram of a method 1100 of determining and tracking the approximate geolocation devices, and, more specifically, of calculating geolocation estimation data for the electronic devices in accordance with the present embodiments. Similarly as discussed above with respect to the method 1000 of FIG. 10, the method 1100 may also be performed by processing logic that may include hardware such as one or more computer processing devices, software (e.g., instructions running/executing on a computer processing device), firmware (e.g., microcode), or a combination thereof, such as the server electronic device 901 discussed above with respect to FIG. 9.

The method 1100 may begin with one or more computer processing devices of the server electronic device identifying one or more client electronic devices of a plurality of client electronic devices to be located (Step 1102). The method 1100 may continue with one or more computer processing devices of the server electronic device generating geolocation estimation data and a geolocation confidence value with respect to the one or more client electronic devices based on, for example, at least one geolocation estimation model (Step 1104). For example, as previously discussed above with respect to method 1000 of FIG. 10, the server electronic device 901 may determine an approximate physical location of one or more client electronic devices 916, 918, 920, 922, and 924 based on a device ID of the one or more client electronic devices 916, 918, 920, 922, and 924 in accordance with a historical distribution, based on approximate distances measured between each of a number the client electronic devices 916, 918, 920, 922, and 924 with respect to each other or with respect to one or more known physical obstructions or constructions (e.g., walls, islands, columns, pillars, and so forth), or based on an estimated velocity and an acceleration of the client electronic devices 916, 918, 920, 922, and 924.

The method 1100 may continue with one or more computer processing devices of the server electronic device determining an approximate physical location of the client electronic device based on the calculated geolocation estimation data and the calculated geolocation confidence value (Step 1106) (e.g., as generally discussed above with respect to FIG. 10). The method 1100 may then conclude with one or more computer processing devices of the server electronic device storing the geolocation estimation data and the geolocation confidence value (Step 1108).

Figure 12:
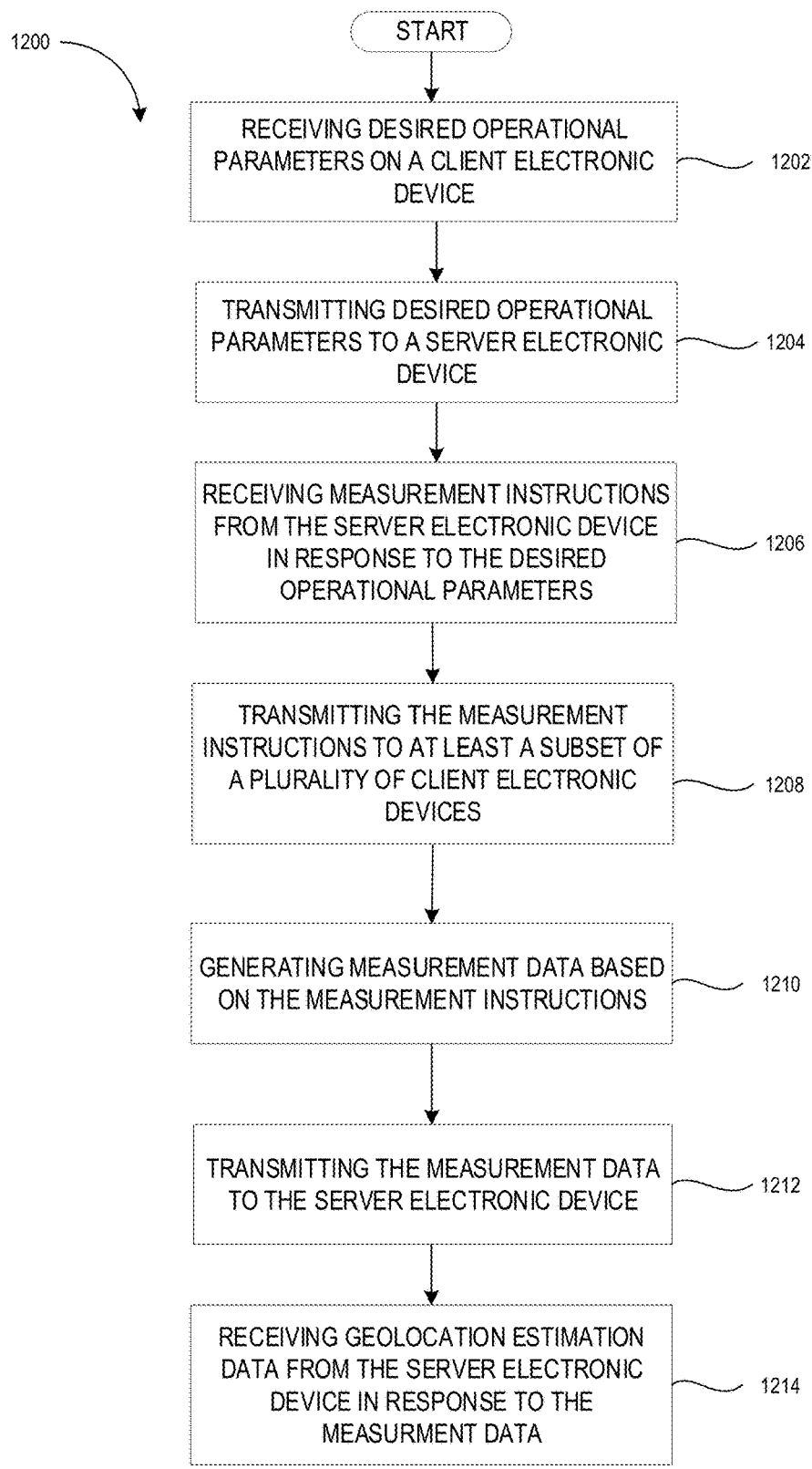
FIG. 12 is a flowchart of an example method for determining and tracking the approximate geolocation of electronic devices in an environment.

Turning now to FIG. 12, which illustrates is a flow diagram of a method 1200 of determining and tracking the approximate geolocation of electronic devices, and, more specifically, a method for receiving calculated geolocation estimation data at a client electronic device in accordance with the present embodiments. The method 1200 may be performed by processing logic that may include hardware such as one or more computer processing devices, software (e.g., instructions running/executing on a computer processing device), firmware (e.g., microcode), or a combination thereof, such as the server electronic device 901 discussed above with respect to FIG. 9.

The method 1200 may begin with one or more processing devices of a client electronic device receiving desired operational parameters on the client electronic device (Step 1202). The method 1200 may continue with one or more computer processing devices of a client electronic device transmitting the desired operational parameters to a server electronic device (Step 1204) (e.g., as generally discussed above with respect to FIG. 10). The method 1200 may then continue with one or more computer processing devices of a client electronic device receiving measurement instructions from the server electronic device based on the desired operational parameters (Step 1206). The method 1200 may then continue with one or more computer processing devices of a client electronic device transmitting the measurement instructions to at least a subset of a plurality of other client electronic devices (Step 1208) (e.g., as generally discussed above with respect to FIG. 10).

The method 1200 may then continue with one or more computer processing devices of a client electronic device generating measurement data based on the measurement instructions received from the server electronic device (Step 1210). The method 1200 may then continue with one or more computer processing devices of a client electronic device transmitting the measurement data to the server electronic device (Step 1212). The method 1200 may then conclude with one or more computer processing devices of a client electronic device receiving geolocation estimation data and a geolocation confidence value from the server electronic device in response to the measurement data (Step 1214) (e.g., as generally discussed above with respect to FIG. 10). As previously noted, the present embodiments may provide techniques to efficiently determine and track the approximate geolocation of electronic devices within indoor environments, outdoor environment, or otherwise in any of various environments in which, for example, large-scale satellite systems such as, GPS may be inaccurate or imprecise.

Figure 13:
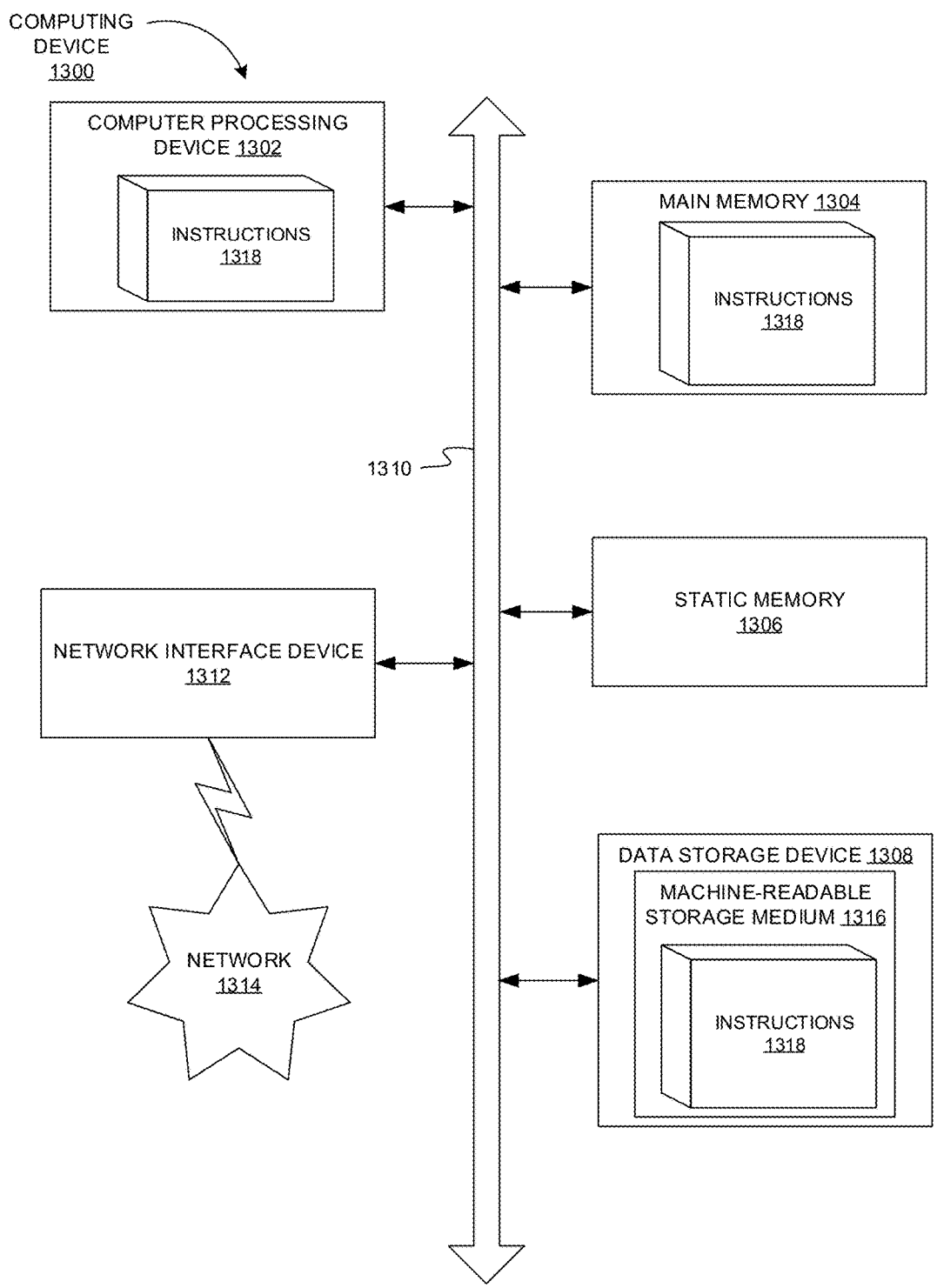
FIG. 13 is a block diagram of an example computing device that may perform one or more of the operations described herein, in accordance with the present embodiments.

FIG. 13 is a block diagram of an example computing device 1300 that may perform one or more of the operations described herein, in accordance with the present embodiments. The computing device 1300 may be connected to other computing devices in a LAN, an intranet, an extranet, and/or the Internet. The computing device 1300 may operate in the capacity of a server machine in client-server network environment or in the capacity of a client in a peer-to-peer network environment. The computing device 1300 may be provided by a personal computer (PC), a set-top box (STB), a server, a network router, switch or bridge, or any machine capable of executing a set of instructions (sequential or otherwise) that specify actions to be taken by that machine. Further, while only a single computing device 1300 is illustrated, the term "computing device" shall also be taken to include any collection of computing devices that individually or jointly execute a set (or multiple sets) of instructions to perform the methods discussed herein.

The example computing device 1300 may include a computer processing device (e.g., a general purpose processor, ASIC, etc.) 1302, a main memory 1304, a static memory 506 (e.g., flash memory and a data storage device 1308), which may communicate with each other via a bus 1310. The computer processing device 1302 may be provided by one or more general-purpose processing devices such as a microprocessor, central processing unit, or the like. In an illustrative example, computer processing device 1302 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. The computer processing device 1302 may also comprise one or more special-purpose processing devices such as an application specific integrated circuit (ASIC), a field programmable gate array (FPGA), a digital signal processor (DSP), network processor, or the like. The computer processing device 1302 may be configured to execute the operations described herein, in accordance with one or more aspects of the present disclosure, for performing the operations and steps discussed herein.

The computing device 1300 may further include a network interface device 1312, which may communicate with a network 1314. The data storage device 1308 may include a machine-readable storage medium 1316 on which may be stored one or more sets of instructions, e.g., instructions for carrying out the operations described herein, in accordance with one or more aspects of the present disclosure. Instructions implementing module 1318 may also reside, completely or at least partially, within main memory 1304 and/or within computer processing device 1302 during execution thereof by the computing device 1300, main memory 1304 and computer processing device 1302 also constituting computer-readable media. The instructions may further be transmitted or received over the network 1314 via the network interface device 1312.

While machine-readable storage medium 1316 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "computer processing device" encompasses all kinds of apparatus, devices, and machines for processing data, including by way of example a programmable processor, a computer, a system on a chip, or multiple ones, or combinations, of the foregoing. Although referred to as a computer processing device, use of the term also encompasses embodiments that include one or more computer processing devices. The computer processing device can include special purpose logic circuitry, e.g., an FPGA (field programmable gate array) or an ASIC (application-specific integrated circuit). The computer processing device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The computer processing device and execution environment can realize various different computing model infrastructures, such as web services, distributed computing and grid computing infrastructures.

A computer program (also known as a program, software, software application, script, or code) can be written in any form of programming language, including compiled or interpreted languages, declarative, procedural, or functional languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processing devices suitable for the execution of a computer program include, by way of example, both general and special purpose microprocessors, and any one or more processors of any kind of digital computer. Generally, a processing device will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic disks, magneto-optical disks, optical disks, or solid state drives. However, a computer need not have such devices. Moreover, a computer can be embedded in another device, e.g., a smart phone, a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processing device and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse, a trackball, a touchpad, or a stylus, by which the user can provide input to the computer.

Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:
   receiving measurement data from at least a subset of a plurality of client electronic devices, the measurement data captured by each respective client electronic device of the subset of the plurality of client electronic devices;
   generating, by a computer processing device, geolocation estimation data for at least one of the subset of the plurality of client electronic devices based at least in part on the measurement data;
   generating, by the computer processing device, a geolocation confidence value based at least in part on the geolocation estimation data, the geolocation confidence value indicating a precision level of the geolocation estimation data; and
   transmitting, by the computer processing device, the geolocation estimation data and the geolocation confidence value to the at least one of the subset of the plurality of client electronic devices.

2. The method of claim 1, wherein receiving the measurement data comprises receiving at least one of: distance data, radio frequency (RF) signal intensity data, or latency data.

3. The method of claim 1, wherein generating the geolocation estimation data comprises generating a longitude coordinate, a latitude coordinate, and an altitude coordinate, the longitude coordinate, the latitude coordinate, and the altitude coordinate indicating an approximate location of at least another one of the subset of the plurality of client electronic devices.

4. The method of claim 1, wherein generating the geolocation estimation data comprises generating a radial estimation, the radial estimation indicating a radius in which at least another one of the subset of the plurality of client electronic devices resides.

5. The method of claim 1, wherein generating the geolocation estimation data comprises generating an indication of whether a client electronic device of the plurality of client electronic devices desiring to be located is stationary or in motion.

6. The method of claim 1, further comprising:
   receiving a desired operational parameter from the at least one of the subset of the plurality of client electronic devices; and determining, by the computer processing device, measurement instructions based at least in part on the desired operational parameter.

7. The method of claim 6, wherein receiving the desired operational parameter comprises receiving a frequency operational parameter, an accuracy operational parameter, a power consumption operational parameter, a processing operational parameter, a bandwidth operational parameter, a hardware usage operational parameter, or a combination thereof.

8. The method of claim 6, wherein determining the measurement instructions comprises determining a set of the plurality client electronic devices within a vicinity of the at least one of the subset of the plurality of client electronic devices, and wherein the set of the plurality client electronic devices comprises the subset of the plurality of client electronic devices.

9. The method of claim 6, wherein determining the measurement instructions comprises determining a data structure by which the subset of the plurality of client electronic devices is to capture the measurement data.

10. An apparatus, comprising:
a computer processing device, the computer processing device to:
receive measurement data from at least a subset of a plurality of client electronic devices, the measurement data captured by each respective client electronic device of the subset of the plurality of client electronic devices;
generate geolocation estimation data for at least one of the subset of the plurality of client electronic devices based at least in part on the measurement data;
generate a geolocation confidence value based at least in part on the geolocation estimation data, the geolocation confidence value indicating a precision level of the geolocation estimation data; and
transmit the geolocation estimation data and the geolocation confidence value to the at least one of the subset of the plurality of client electronic devices.

11. The apparatus of claim 10, wherein to receive the measurement data, the computer processing device is to receive at least one of: distance data, radio frequency (RF) signal intensity data, or latency data.

12. The apparatus of claim 10, wherein to generate the geolocation estimation data, the computer processing device is to generate a longitude coordinate, a latitude coordinate, and an altitude coordinate, the longitude coordinate, the latitude coordinate, and the altitude coordinate indicating an approximate location of at least another one of the subset of the plurality of client electronic devices.

13. The apparatus of claim 10, wherein to generate the geolocation estimation data, the computer processing device is to generate a radial estimation, the radial estimation indicating a radius in which at least another one of the subset of the plurality of client electronic devices resides.

14. The apparatus of claim 10, wherein to generate the geolocation estimation data, the computer processing device is to generate an indication of whether a client electronic device of the plurality of client electronic devices desiring to be located is stationary or in motion.

15. A non-transitory computer-readable storage medium including instructions that, when executed by a computer processing device, cause the computer processing device to:
receive measurement data from at least a subset of a plurality of client electronic devices, the measurement data captured by each respective client electronic device of the subset of the plurality of client electronic devices;
generate, by the computer processing device, geolocation estimation data for at least one of the subset of the plurality of client electronic devices based at least in part on the measurement data;
generate, by the computer processing device, a geolocation confidence value based at least in part on the geolocation estimation data, the geolocation confidence value indicating a precision level of the geolocation estimation data; and
transmit the geolocation estimation data and the geolocation confidence value to the at least one of the subset of the plurality of client electronic devices.

16. The non-transitory computer-readable storage medium of claim 15, wherein to receive the measurement data, the computer processing device is to receive at least one of: distance data, radio frequency (RF) signal intensity data, or latency data.

17. The non-transitory computer-readable storage medium of claim 15, wherein to generate the geolocation estimation data, the computer processing device is to generate a longitude coordinate, a latitude coordinate, and an altitude coordinate, the longitude coordinate, the latitude coordinate, and the altitude coordinate indicating an approximate location of at least another one of the subset of the plurality of client electronic devices.

18. The non-transitory computer-readable storage medium of claim 15, wherein to generate the geolocation estimation data, the computer processing device is to generate an indication of whether a client electronic device of the plurality of client electronic devices desiring to be located is stationary or in motion.

19. The non-transitory computer-readable storage medium of claim 15, wherein to generate the geolocation estimation data, the computer processing device is to generate a radial estimation, the radial estimation indicating a radius in which at least another one of the subset of the plurality of client electronic devices resides.

20. The non-transitory computer-readable storage medium of claim 15, wherein the computer processing device is to:
receive a desired operational parameter from the at least one of the subset of the plurality of client electronic devices; and
determine measurement instructions based at least in part on the desired operational parameter.

* * * * *